(12) United States Patent
Wu et al.

(10) Patent No.: US 9,880,422 B2
(45) Date of Patent: Jan. 30, 2018

(54) LIQUID CRYSTAL PANEL, DISPLAY APPARATUS AND METHOD FOR MANUFACTURING THE LIQUID CRYSTAL PANEL

(71) Applicants: BOE Technology Group Co., Ltd., Beijing (CN); Beijing BOE Optoelectronics Technology Co., Ltd., Beijing (CN)

(72) Inventors: Xiaojuan Wu, Beijing (CN); Jian Wang, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/906,400

(22) PCT Filed: Jun. 16, 2015

(86) PCT No.: PCT/CN2015/081510
§ 371 (c)(1),
(2) Date: Jan. 20, 2016

(87) PCT Pub. No.: WO2016/119371
PCT Pub. Date: Aug. 4, 2016

(65) Prior Publication Data
US 2016/0377924 A1    Dec. 29, 2016

(30) Foreign Application Priority Data
Jan. 27, 2015  (CN) .......................... 2015 1 0041390

(51) Int. Cl.
*G02F 1/1337*  (2006.01)
*C08F 122/20*  (2006.01)
(Continued)

(52) U.S. Cl.
CPC ...... *G02F 1/133711* (2013.01); *C08F 122/20* (2013.01); *C09D 133/14* (2013.01);
(Continued)

(58) Field of Classification Search
CPC ........ G02F 2001/133715; G02F 2001/133757; G02F 2001/133726; G02F 1/133788; G02F 1/133711; G02F 1/133715
(Continued)

(56) References Cited

U.S. PATENT DOCUMENTS 5,850,274 A   12/1998  Shin et al.
5,856,857 A    1/1999  Kim
(Continued)

FOREIGN PATENT DOCUMENTS

CN    102010720 A    4/2011
CN    102495494 A    6/2012
(Continued)

OTHER PUBLICATIONS

Nov. 11, 2015—(WO)—International Search Report and Written Opinion Appn PCT/CN2015/081510 with English Tran.
(Continued)

*Primary Examiner* — John A McPherson
(74) *Attorney, Agent, or Firm* — Banner & Witcoff, Ltd.

(57) ABSTRACT

Disclosed are a liquid crystal panel, a display apparatus and a manufacturing method of the liquid crystal panel. The manufacturing method of the liquid crystal panel includes: forming a first alignment layer covering a substrate surface and having an alignment direction along a first direction on a first substrate; the first substrate includes multiple column pixel areas; forming a second alignment layer having an alignment direction along a second direction on the first alignment layer, the first direction and the second direction are different directions, in correspondence with each of the (Continued)

column pixel areas, the second alignment layer has at least one aligning unit that penetrates the column pixel areas, and a width of each of the aligning unit is smaller than a width of the column pixel area.

17 Claims, 12 Drawing Sheets

(51) Int. Cl.
*C09D 133/14* (2006.01)
*C09K 19/56* (2006.01)
*C09K 19/20* (2006.01)
*C09K 19/24* (2006.01)
*C09K 19/30* (2006.01)
*C09K 19/04* (2006.01)

(52) U.S. Cl.
CPC .......... *C09K 19/2021* (2013.01); *C09K 19/24* (2013.01); *C09K 19/3086* (2013.01); *C09K 19/56* (2013.01); *G02F 1/1337* (2013.01); *G02F 1/133788* (2013.01); *C09K 2019/0437* (2013.01); *G02F 2001/133726* (2013.01); *G02F 2001/133757* (2013.01)

(58) Field of Classification Search
USPC ......... 430/320, 321; 349/123, 124, 127, 129
See application file for complete search history.

(56) References Cited

U.S. PATENT DOCUMENTS

| | | | |
|---|---|---|---|
| 2002/0047971 A1 | 4/2002 | Kwon et al. | |
| 2005/0083476 A1* | 4/2005 | Yang | G02F 1/1341 349/153 |
| 2007/0154657 A1* | 7/2007 | Sha | G02F 1/133753 428/1.6 |
| 2015/0362803 A1* | 12/2015 | Ahn | G02F 1/133703 349/123 |

FOREIGN PATENT DOCUMENTS

| | | |
|---|---|---|
| CN | 104087315 A | 10/2014 |
| CN | 104090431 A | 10/2014 |
| CN | 104098725 A | 10/2014 |
| CN | 104142587 A | 11/2014 |
| CN | 104166275 A | 11/2014 |
| JP | H6265903 A | 3/1987 |
| JP | 2000122066 A | 4/2000 |

OTHER PUBLICATIONS

May 31, 2016—(CN)—First Office Action Appn 201510041390.1 with English Tran.

* cited by examiner

LIQUID CRYSTAL PANEL, DISPLAY APPARATUS AND METHOD FOR MANUFACTURING THE LIQUID CRYSTAL PANEL

The application is a U.S. National Phase Entry of International Application No. PCT/CN2015/081510 filed on Jun. 16, 2015, designating the United States of America and claiming priority to Chinese Patent Application No. 201510041390.1 filed on Jan. 27, 2015. The present application claims priority to and the benefit of the above-identified applications and the above-identified applications are incorporated by reference herein in their entirety.

TECHNICAL FIELD

Embodiments of the present disclosure relate to a liquid crystal panel, a display apparatus and a method for manufacturing the liquid crystal panel.

BACKGROUND

Among flat panel display apparatus, Thin Film Transistor Liquid Crystal Displays (briefly called as TFT-LCDs) have characteristics of small volume, low power consumption, relatively low manufacturing cost, irradiation-free, etc., and thus play a leading role in the current market for flat panel displays. A common liquid crystal display can be used as a cell-phone display panel, a Notebook computer display panel, a GPS display panel, a display panel of a liquid crystal television, or the like. Along with the progress of science and technology, traditional mono-domain liquid crystal displays have been unable to meet the people's demands on LCDs due to the following shortcomings: the contrast is low, the viewing angle is asymmetric, chromatic aberration will occur when a display picture is viewed from different angles, etc. Multi-domain display technology has gradually developed, and multi-domain displays have the merits of improving the asymmetric viewing angle of a liquid crystal display, enlarging the viewing angle, enhancing the contrast, improving the grayscale reversal, effectively improving the chromatic aberration, and so on.

In order to realize the multi-domain display of liquid crystal displays, many researchers have studied on it. In a usual multi-domain display, one pixel of the liquid crystal display is divided into four sub-pixels, and next, alignment layers with different frictional alignment directions are produced within regions of the four sub-pixels, respectively, so that liquid crystal molecules are formed into different initial alignments. It is formed into a multi-domain state in the course of applying a voltage to it, and then, a multi-domain display is realized. However, it is required by the method that rubbing be carried on an alignment layer many times within one pixel, and the manufacturing procedure is complex. In addition, it is difficult to fabricate a rubbing roller for conducting friction many times on the same pixel area, As a result, the process is hard to be achieved.

SUMMARY DISCLOSURE

According to embodiments of the present disclosure, there are provided a liquid crystal panel, a display apparatus and a manufacturing method of the liquid crystal panel, for simplifying the manufacturing procedure of a multi-domain liquid crystal panel, and reducing the difficulty of manufacturing process of the multi-domain liquid crystal panel.

According to at least one embodiment of the present disclosure, there is provided a manufacturing method of a liquid crystal panel, comprising the following steps:

forming a first alignment layer covering a substrate surface and having an alignment direction along a first direction on a first substrate; the first substrate includes multiple column pixel areas;

forming a second alignment layer having an alignment direction along a second direction on the first alignment layer, the first direction and the second direction are different, in correspondence with each of the column pixel areas, the second alignment layer has at least one aligning unit that penetrates the column pixel areas, and a width of each of the aligning unit is smaller than a width of the column pixel area.

For example, in the manufacturing method of the liquid crystal panel, in the case that in correspondence with each of the column pixel areas, the second alignment layer has a plurality of aligning units penetrating the column pixel areas, alignment directions of the plurality of the aligning units are the same or different.

For example, in the manufacturing method of the liquid crystal panel, regarding the plurality of the aligning units in correspondence with each of the column pixel areas, in the case that alignment directions of the plurality of aligning units are the same, the plurality of the aligning units are arranged separately; and in the case that alignment directions of the plurality of aligning units are different, the plurality of aligning units with different alignment directions are arranged alternately.

For example, in the manufacturing method of the liquid crystal panel, the second alignment layer is a cholesteric liquid crystal polymer alignment layer containing a chiral azobenzene compound.

For example, in the manufacturing method of the liquid crystal panel, forming the second alignment layer having an alignment direction along the second direction on the first alignment layer includes the following steps:

coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;

conducting ultraviolet irradiation on the mixture layer via a mask, so that a portion of the mixture layer irradiated by ultraviolet light is formed to have an alignment along a second direction, the mask has an opening corresponding to each of the aligning units;

removing a portion of the mixture layer not irradiated by ultraviolet light, thus forming the second alignment layer.

For example, in correspondence with each of the column pixel area, the second alignment layer has two aligning units penetrating the column pixel areas, and thus in the manufacturing method of the liquid crystal panel, forming the second alignment layer having an alignment direction along the second direction on the first alignment layer includes the following steps:

coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;

conducting ultraviolet irradiation on the mixture layer via a first mask, thus forming first aligning units, the first mask has an opening corresponding to each of the first aligning units;

conducting ultraviolet irradiation on the mixture layer via a second mask, thus forming second aligning units, the second mask has an opening corresponding to each of the second aligning units;

removing a portion of the mixture layer not irradiated by ultraviolet light, thus forming the second alignment layer.

For example, in the manufacturing method of the liquid crystal panel, the mixture layer further includes a thermally polymerizable monomer, the thermally polymerizable monomer includes a bisphenol F epoxy resin and 4,4'-diamino dicyclohexyl methane, the content of which are 10 to 40 parts by weight and 10 to 40 parts by weight, respectively, after the mixture layer is subjected to ultraviolet irradiation via a mask, it further includes heating the first substrate subjected to ultraviolet irradiation to a set temperature, thus stabilizing the second alignment direction.

For example, in the manufacturing method of the liquid crystal panel, the chiral azobenzene compound is:

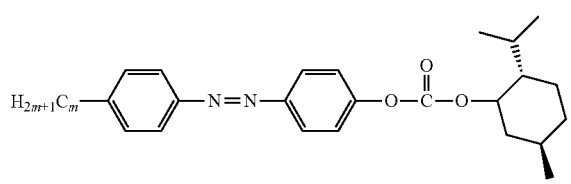

wherein, m is an integer chosen from 1 to 10;

the cholesteric liquid crystal polymerizable monomer is:

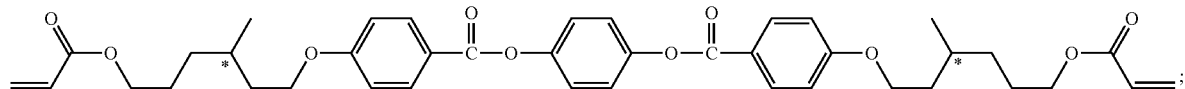

the photoinitiator is:

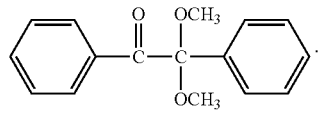

For example, in the manufacturing method of the liquid crystal panel, the bisphenol F epoxy resin is:

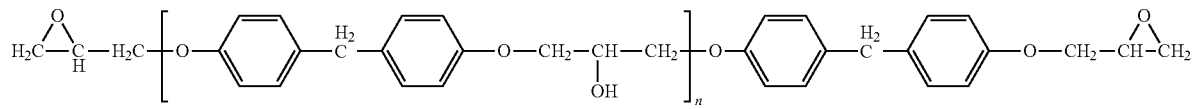

wherein, n is an integer chosen from 1 to 6.

For example, the manufacturing method of the liquid crystal panel further includes a step of cell-assembling a second substrate and the first substrate under vacuum.

According to at least an embodiment of the present disclosure, there is further provided a liquid crystal panel, comprising a first substrate and a second substrate that are cell-assembled, and a liquid crystal layer disposed between the first substrate and the second substrate, wherein, the first substrate and/or the second substrate have/has an alignment layer on a face facing the liquid crystal layer, the alignment layer include:

a first alignment layer covering a substrate surface and having an alignment direction along a first direction; the first substrate containing multiple column pixel areas;

a second alignment layer located on a face of the first alignment layer facing the liquid crystal layer and having an alignment direction along a second direction, the first direction and the second direction are different, in correspondence with each of the column pixel areas, the second alignment layer has at least one aligning unit that penetrate the column pixel areas, and a width of each of the aligning units is smaller than a width of the column pixel area.

For example, in the liquid crystal panel, in the case that in correspondence with each of the column pixel areas, the second alignment layer has a plurality of aligning units penetrating the column pixel areas, alignment directions of the plurality of aligning units are the same or different.

For example, in the liquid crystal panel, regarding the plurality of the aligning units in correspondence with each of the column pixel areas, in the case that alignment directions of the plurality of aligning units are the same, the plurality of the aligning units are arranged separately; and in the case that alignment directions of the plurality of aligning units are different, the plurality of aligning units with different alignment directions are arranged alternately.

For example, in the liquid crystal panel, the second alignment layer is a cholesteric liquid crystal polymer alignment layer containing a chiral azobenzene compound.

According to at least an embodiment of the present disclosure, there is further provided a display apparatus, comprising the liquid crystal panel as stated by any of above embodiments.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the disclosure.

REFERENCE NUMERALS

1—a first substrate; 2—a second substrate; 3—a liquid crystal layer; 4—an alignment layer; 5—a pixel area; 6—a row pixel area; 111—a scan signal line; 112—a data signal line; 113—a thin film transistor; 114—a pixel electrode; 115—a sub pixel; 116—a light filtering block; 117—a black matrix; 41—a first alignment layer; 42—a second alignment layer; 420—an alignment unit; 421—a first alignment unit; 422—a second alignment unit.

DETAILED DESCRIPTION

In order to make objects, technical details and advantages of the embodiments of the present disclosure apparent, hereinafter, the technical solutions of the embodiments of the present disclosure will be described in a clearly and fully understandable way in connection with the drawings related to the embodiments of the present disclosure. It is obvious that the described embodiments are just a part but not all of the embodiments of the present disclosure. Based on the described embodiments of the present disclosure, those ordinarily skilled in the art can obtain other embodiment(s), without any inventive work, which should be within the scope sought for protection by the present disclosure.

In order to simplify the manufacturing procedure of a multi-domain liquid crystal panel, according to embodiments of the present disclosure, there are provided a liquid crystal panel, a display apparatus and a manufacturing method of the liquid crystal panel. In the technical solution, by means of producing an alignment layer with a specific alignment on a conventional alignment layer, these two alignment layers are present within each pixel area. In turn, multiple initial alignments of liquid crystal molecules are formed within each pixel area, thereby achieving multi-domain display of the liquid crystal panel. As only one cholesteric liquid crystal polymer alignment layer containing a chiral azobenzene compound is added in the technical solution comparing with a mono-domain liquid crystal panel, manufacturing process of the multi-domain liquid crystal panel can be simplified, and the difficulty of manufacturing process of the multi-domain liquid crystal panel can also be reduced. The technical solution of embodiments of the present disclosure will be described below in conjunction with attached drawings.

Figure 1:
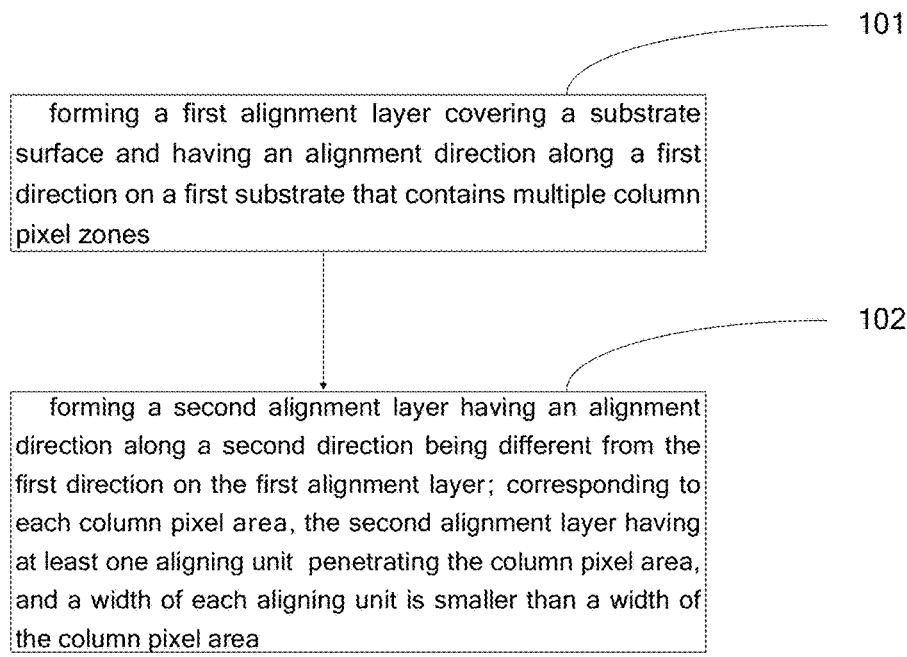
FIG. 1 is a schematic flowchart illustrating a manufacturing method of a liquid crystal panel structure provided by an embodiment of the present disclosure.

According to an embodiment of the present disclosure, there is firstly provided a manufacturing method of a liquid crystal panel, as shown in FIG. 1. FIG. 1 is a schematic flowchart illustrating the manufacturing method of a liquid crystal panel provided by an embodiment of the present disclosure. The manufacturing method includes the following steps.

Step 101, a first alignment layer covering a surface of a substrate and having an alignment direction along a first direction is formed in a first substrate; the first substrate contains multiple column pixel areas.

Step 102, a second alignment layer having an alignment direction along a second direction is formed on the first alignment layer, the first direction and the second direction are different directions, in correspondence with each of the column pixel areas, the second alignment layer has at least one alignment unit penetrating the column pixel areas, and a width of each of the alignment units is smaller than a width of the column pixel area.

In the technical solution provided by embodiments of the present disclosure, in such a way that a second alignment layer having a different alignment direction from a first alignment layer is formed on the first alignment layer, alignment units of the second alignment layer penetrate column pixel areas, and a width of each alignment units is smaller than a width of one column pixel area, liquid crystal molecules in direct contact with the first alignment layer are initially aligned in a first direction within one pixel area, while liquid crystal molecules in direct contact with the second alignment layer are initially aligned in a second direction of surface molecules of the second alignment layer. Thus, multiple initial alignments of liquid crystal molecules are formed within one pixel area, and multi-domain display of liquid crystal panel is realized. By adopting the manufacturing method of the liquid crystal panel provided by embodiments of the present disclosure, without the need of conducting rubbing many times within a single pixel area, multi-domain display can be realized only by producing two alignment layers with different alignment directions, and the manufacturing process can be significantly simplified. In addition, as for the usual case that rubbing is conducted on the same pixel area many times, it is difficult to manufacture a rubbing roller, and this lead to increased difficulty of producing process. While in the technical solution provided by embodiments of the present disclosure, the only thing need to be carried out is to produce a first alignment layer covering a surface of a substrate, and then to produce at least one alignment unit of a second alignment layer that penetrate each column pixel area, resulting in a simple manufacturing process.

Among general technologies, it is also the case that strips of protrusions are produced under a pixel electrode, so that an oblique electric field is formed between the pixel electrode with the special shape and a common electrode of an upper glass substrate, and liquid crystal molecules are having an alignment direction along the direction of the electric field to form a multi-domain state, thereby achieving multi-domain liquid crystal display. In addition, among general technologies, it is also the case that multi-domain display is realized by constructing a multi-domainized pixel electrode. However, whether in the case that protrusions are produced under a pixel electrode, or in the case that a pixel electrode is multi-domainized, the manufacturing process of a multi-domain liquid crystal display apparatus is very complex, the process cost is high, and it is difficult to carry out. While in the technical solution provided by embodiments of the present disclosure, multi-domainized display can be realized merely by adding an alignment layer, the process can be greatly simplified, and the processing difficulty is reduced.

For example, in the manufacturing method of the liquid crystal panel, the second alignment layer is a cholesteric liquid crystal polymer alignment layer containing a chiral azobenzene compound.

Figure 2:
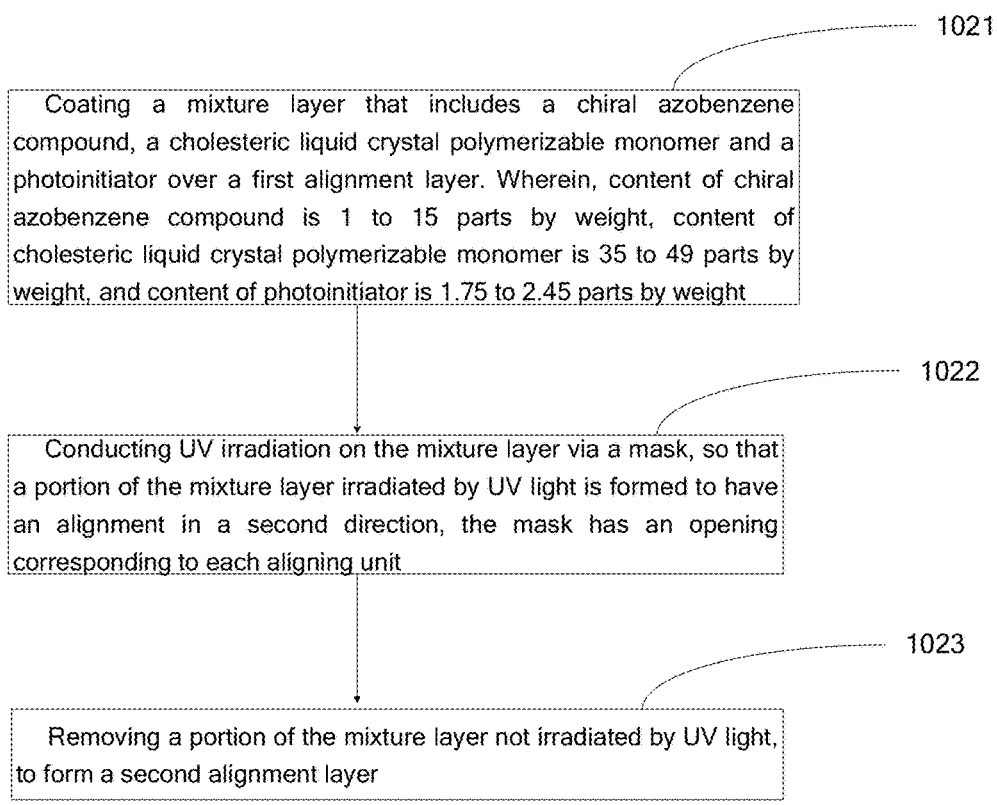
FIG. 2 is a schematic view illustrating the detailed flow of a step 102 shown in FIG. 1.

For example, as shown in FIG. 2, which is a schematic flowchart illustrating a step 102 shown in FIG. 1, the step 102 includes the following steps.

Step 1021, a mixture layer is coated over a first alignment layer, and includes a chiral azobenzene compound, a cholesteric liquid crystal polymerizable monomer and a photoinitiator. Wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight.

Step 1022, the mixture layer is subjected to ultraviolet illumination via a mask, so that a portion of the mixture layer irradiated by ultraviolet light is formed to have an orientation along a second direction, and the mask has an opening in correspondence with each alignment unit.

Step 1023, a portion of the mixture layer not being irradiated by ultraviolet light is removed, thus forming a second alignment layer.

Because the mixture layer directly contacts the first alignment layer, cholesteric liquid crystal polymerizable monomer molecules in the mixture layer are arranged in the alignment direction of the first alignment layer at a location close to the first alignment layer. As the thickness increases, arranging direction of molecules of the cholesteric liquid crystal polymerizable monomer twists gradually, and an initial screw-pitch size is formed at its surface. By means of coating a mixture layer that includes a chiral azobenzene compound, a cholesteric liquid crystal polymerizable monomer and a photoinitiator on a first alignment layer, and conducting ultraviolet illumination on the mixture layer via a mask to form the irradiated portion of the chiral azobenzene compound into a certain structure, a certain screw-pitch is formed in the corresponding mixture layer. Meanwhile, this screw-pitch size is fixed by the formation of a liquid crystal polymer through a cross-linking reaction of cholesteric liquid crystal polymerizable monomers. Consequently, a portion of the mixture layer irradiated by ultraviolet light is formed to have an orientation along a second direction. Besides, the chiral azobenzene compound employed in embodiments of the present disclosure possesses cis-trans isomerism, it can be transformed from a normal trans-structure into a cis-structure under ultraviolet light irradiation, and as the irradiation time increases, helically twisting power of the chiral azobenzene decreases gradually, and accordingly, screw-pitch of cholesteric liquid crystal doped with this chiral azobenzene increases gradually. Consequently, size of the screw-pitch can be adjusted according to the length of illumination time, so as to facilitate adjustment in alignment direction of the second alignment layer.

In the mixture layer, in order to further stabilize orientation of the second alignment layer, the mixture layer further includes a thermally polymerizable monomer. The thermally polymerizable monomer includes diglycidyl ether of bisphenol F (briefly called as DGEBF) and 4,4'-diamino dicyclohexyl methane (briefly called as PACM), and their contents are 10 to 40 parts by weight and 10 to 40 parts by weight, respectively. After the mixture layer is subjected to ultraviolet illumination via a mask, it further includes heating the first substrate subjected to ultraviolet illumination to a set temperature, thus stabilizing the second alignment direction.

For example, in the technical solution, when heated at a set temperature, thermally polymerizable monomers in the mixture layer are made to undergo a reaction so as to form a polymer, and thus the thread-pitch size of cholesteric liquid crystal can be further stabilized. This makes orientation of the second alignment layer be more stable.

For example, benzoin dimethyl ether is used as the photoinitiator. Content of the chiral azobenzene compound in the mixture of chiral azobenzene compound/cholesteric liquid crystal polymerizable monomer/thermally polymerizable monomer/photoinitiator is 1 to 15%, content of cholesteric liquid crystal polymerizable monomer is 35 to 49%, content of thermally polymerizable monomer DGEBF is 10 to 40%, content of thermally polymerizable monomer PACM is 10 to 40%, content of the photoinitiator is 5% of the cholesteric liquid crystal polymerizable monomer.

For example, the chiral azobenzene compound is 4-alkylmenthyl azophenol ester, and the chemical structural formula is:

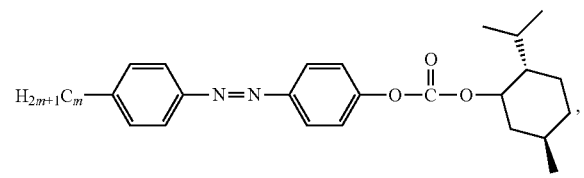

wherein, m is an integer chosen from 1 to 10.

The cholesteric liquid crystal polymerizable monomer is 2-methyle-1,4-bis(4-(6'-propyleneoxyhexyloxy)benzoyloxy)benzene, the chemical structural formula is:

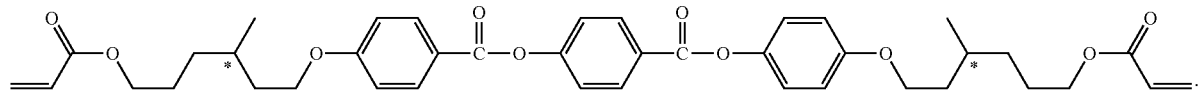 [SMILES: C=CC(=O)OCCCC(C)CCOc1ccc(OC(=O)c2ccc(OC(=O)c3ccc(OCCC(C)CCCOC(=O)C=C)cc3)cc2)cc1]

The chemical structural formula of diglycidyl ether of bisphenol F is:

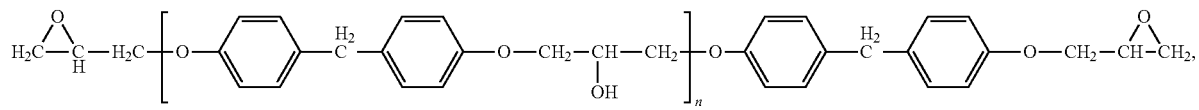

wherein, n is an integer chosen from 1 to 6.

The photoinitiator benzoin dimethyl ether is:

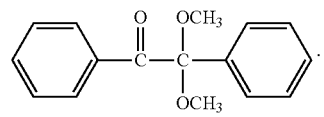 [SMILES: COC(OC)(C(=O)c1ccccc1)c1ccccc1]

Figure 3:
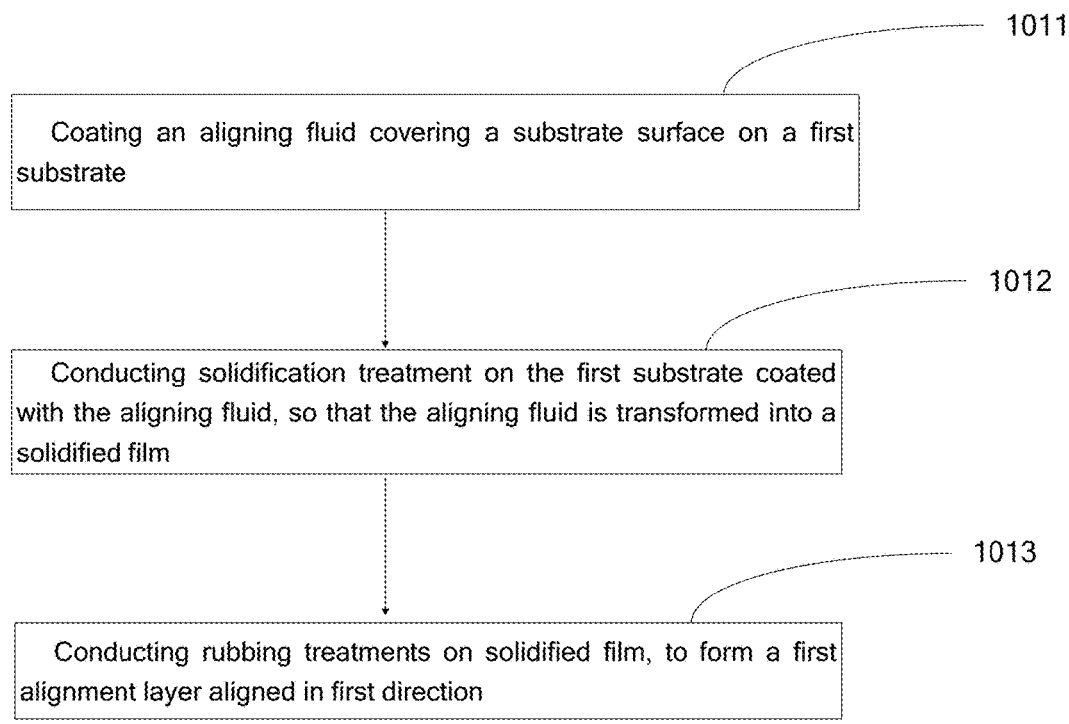
FIG. 3 is a schematic view illustrating the detailed flow of a step 101 shown in FIG. 1.

A conventional alignment layer can be used as the first alignment layer, and for example, it is made by using a rubbing method, as shown in FIG. 3. FIG. 3 is a schematic flowchart illustrating a step 101 shown in FIG. 1, and for example, forming a first alignment layer that covers a substrate surface and orients along a first direction on a substrate (i.e. the step 101) includes the following steps.

Step 1011, an aligning fluid covering a substrate surface is coated on a first substrate.

Step 1012, a solidification treatment is conducted on the first substrate with the aligning fluid coated thereon, so that the aligning fluid is formed into a solidified film.

Step 1013, a rubbing treatment is conducted on the solidified film, thus forming a first alignment layer having an alignment direction along a first direction.

The manufacturing method of the first alignment layer according to embodiments of the present disclosure is not limited to the embodiment, and when a photoalignment layer is used as the first alignment layer, it can be made by using a conventional manufacturing process of photoalignment layer.

Figure 4:
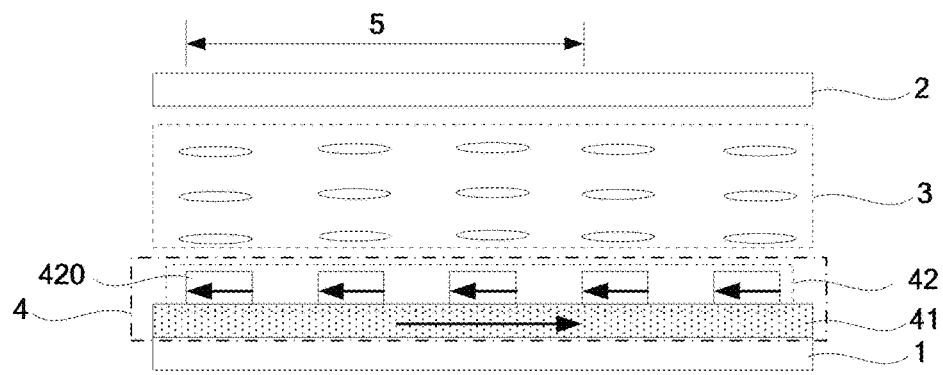
FIG. 4 is a structurally schematic view illustrating a liquid crystal panel provided by an embodiment of the present disclosure.

According to an embodiment of the present disclosure, there is further provided a liquid crystal panel. As shown in FIG. 4, which is a structurally schematic view illustrating a liquid crystal panel provided by an embodiment of the present disclosure, the liquid crystal panel includes a first substrate 1 and a second substrate 2 that are cell-assembled, and a liquid crystal layer 3 disposed between the first substrate 1 and the second substrate 2. The first substrate 1 has an alignment layer 4 on a face facing the liquid crystal layer, and the alignment layer 4 includes:

a first alignment layer 41 covering a substrate face and having an alignment direction along a first direction;

a second alignment layer 42 located on a face of the first alignment layer 41 facing the liquid crystal layer 3 and having an alignment direction along a second direction, wherein, the second alignment layer 42 is a cholesteric liquid crystal polymer alignment layer containing a chiral azobenzene compound, and in correspondence with each column pixel area, the second alignment layer 42 has at least one alignment unit 420 penetrate the column pixel areas, and a width of each alignment unit is smaller than a width of the column pixel area.

In the technical solution provided by embodiments of the present disclosure, by means of forming a second alignment layer 42 that possesses a certain alignment and has a different alignment direction from a first alignment layer 41 on the first alignment layer 41 of a first substrate 1 (for example, the alignment direction of the first alignment layer 41 is such as the arrow direction within the first alignment layer 41 in FIG. 1, and the alignment direction of second alignment layer 42 is such as the arrow direction within an alignment unit 420 of the second alignment layer 42 in FIG. 1), within one pixel area 5, liquid crystal molecules in direct contact with the first alignment layer 41 are initially aligned in its alignment direction; while liquid crystal molecules in direct contact with the second alignment layer 42 are initially aligned in the arranging direction of surface molecules of the second alignment layer. Thus, multiple initial alignments of liquid crystal molecules are formed within one pixel area 5, and liquid crystal multi-domain display is realized. In the technical solution according to embodiments of the present disclosure, the second alignment layer 42 includes a plurality of alignment units 420 arranged in parallel, and length direction of the alignment units 420 will not be limited in embodiments of the present disclosure. The alignment units 420 may penetrate column pixel areas, and may penetrate row pixel areas, as long as a part of the alignment units 420 is present in each of the pixel areas. It is to be noted that, the directions of the arrows placed within the first alignment layer 41 and the alignment unit 420 in FIG. 1 represent alignment directions of corresponding alignment layer, and it's the same case with the other drawings as follows.

Continue referring to FIG. 4, in the technical solution according to embodiments of the present disclosure, an alignment layer may also be produced on a second substrate 2, and its structure may be the same as structure of the alignment layer 4 of the first substrate 1. It may also be the case that only one conventional alignment layer is produced, and an alignment layer may not be produced on the second substrate 2, either. In the event that an alignment layer is merely produced on a first substrate and no alignment layer is produced on a second substrate 2, on the premise of ensuring multi-domain display, cost of the liquid crystal panel is reduced as well.

Please continue to refer to that shown in FIG. 4, for example, in the technical solution according to embodiments of the present disclosure, the first substrate 1 may be an array substrate or a color filter substrate, and the second substrate 2 is a color filter substrate or an array substrate accordingly.

For example, the manufacturing method of the liquid crystal panel further include a step 103 of cell-assembling a second substrate and a first substrate.

According to an embodiment of the present disclosure, there is further provided a display apparatus, which includes the liquid crystal panel as stated by any of the above embodiments.

In the display apparatus according to embodiments of the present disclosure, as multi-domain display can be formed by any of the above liquid crystal panels, and its manufacturing process is simple, multi-domain display can be realized by the display apparatus as well, and it manufacturing process is simple. The display apparatus may be an electronic paper, a liquid crystal display or other display device as well as a television, a digital photo frame, a cell phone, a watch, a tablet computer, a notebook computer, a navigator or any other product or component having a display function that includes these display devices.

Figure 5:
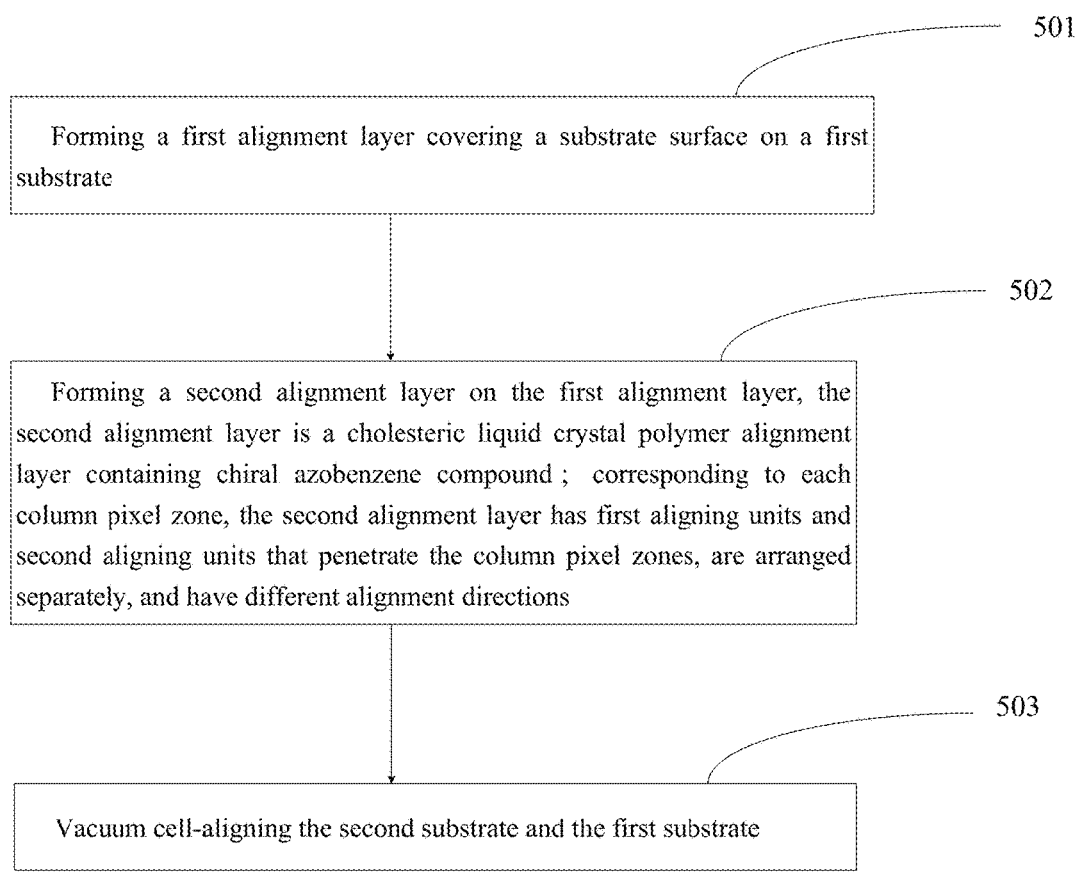
FIG. 5 is a schematic flowchart illustrating a manufacturing method of a liquid crystal panel provided by another embodiment of the present disclosure.

According to an embodiment of the present disclosure, there is further provided a manufacturing method of another liquid crystal panel, as shown in FIG. 5, which is a schematically flowchart illustrating the manufacturing method of a liquid crystal panel provided by another embodiment of the present disclosure. The manufacturing method includes the following steps.

Step 501, a first alignment layer covering a substrate face is formed on a first substrate.

Step 502, a second alignment layer is formed on the first alignment layer, the second alignment layer is a cholesteric liquid crystal polymer alignment layer that contains a chiral azobenzene compound, and in correspondence with each column pixel area, the second alignment layer possessing a first alignment unit and a second alignment unit that are arranged separately and penetrate the column pixel areas, wherein, alignment directions of the first alignment unit and the second alignment unit are different.

Step 503, a second substrate and the first substrate are cell-assembled under vacuum.

In the technical solution according to embodiments of the present disclosure, a cholesteric liquid crystal polymer containing a chiral azobenzene compound is used as the second alignment layer, and a first alignment unit and a second alignment unit arranged separately exit within each column pixel area. Because the first alignment unit and the second alignment unit have different alignment directions, within one pixel area, liquid crystal molecules in direct contact with the first alignment unit are initially aligned in a first direction, while liquid crystal molecules in direct contact with the second alignment unit are initially aligned in a second direction. Consequently, multiple initial alignments of liquid crystal molecules are formed within one pixel area, and multi-domain display of liquid crystal panel is realized. When the manufacturing method of the liquid crystal panel according to embodiments of the present disclosure is adopted, without the need of conducting rubbing many times within a single pixel area, the only thing to do is to perform orientation adjustment according to different parameters of cholesteric liquid crystal polymer that contains a chiral azobenzene compound, and thus a second alignment layer with a different alignment direction is achieved. In turn, multi-domain display can be realized, and the manufacturing process can be simplified greatly. In addition, as for the usual case that rubbing is conducted on the same pixel area many times, it is difficult to manufacture a rubbing roller, and this lead to increased difficulty of producing process. While in the technical solution provided by embodiments of the present disclosure, the only thing need to be carried out is to produce a first alignment layer covering a substrate surface, and then to produce a second alignment layer that penetrate each column pixel area and has alignment units with different alignment directions formed therein, resulting in a simple manufacturing process.

Figure 6:
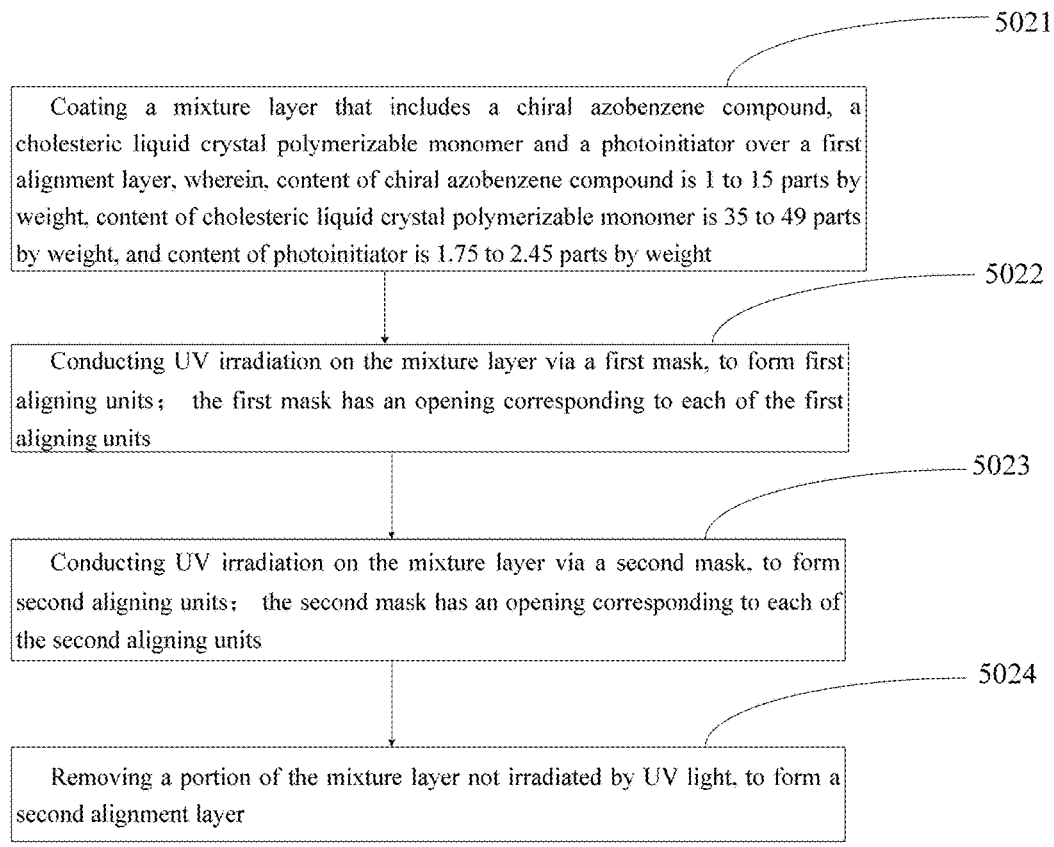
FIG. 6 is a schematic flowchart illustrating a step 502 shown in FIG. 5.

For example, as shown in FIG. 6, which is a schematic flowchart illustrating a step 502 shown in FIG. 5, the step 502 includes the following steps.

Step 5021, a mixture layer is coated over a first alignment layer, and includes a chiral azobenzene compound, a cholesteric liquid crystal polymerizable monomer and a photoinitiator. Wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight.

Step 5022, the mixture layer is subjected to ultraviolet illumination via a first mask, so as to form first alignment units, and the first mask has an opening in correspondence with each of the first alignment units.

Step 5023, the mixture layer is subjected to ultraviolet illumination via a second mask, so as to form second alignment units, and the second mask has an opening in correspondence with each of the second alignment units.

Step 5024, a portion of the mixture layer not being irradiated by ultraviolet light is removed, thus forming a second alignment layer.

For example, in the embodiment, two ultraviolet illuminations are conducted on the mixture layer by using different masks, and the irradiation time for each time differ, so that chiral azobenzene compounds in different regions have different structures. Thus, a cholesteric liquid crystal polymer alignment layer with different alignment directions in adjacent regions is formed. Namely, first alignment units and second alignment units arranged separately are formed.

For example, the mixture layer further includes a thermally polymerizable monomer. The thermally polymerizable monomer includes diglycidyl ether of bisphenol F and 4,4'-diamino dicyclohexyl methane, and their contents are 10 to 40 parts by weight and 10 to 40 parts by weight, respectively. After the mixture layer is subjected to ultraviolet illumination via a second mask to form second alignment units, it further includes heating the first substrate subjected to ultraviolet illumination to a set temperature, thus stabilizing alignment directions of the first alignment units and the second alignment units.

In the technical solution, when heated at a set temperature, thermally polymerizable monomers in the mixture layer are made to undergo a reaction so as to form a polymer, and thus the thread-pitch size of cholesteric liquid crystal can be further stabilized. This makes orientation of the second alignment layer be more stable.

For example, the chiral azobenzene compound is 4-alkyl-menthyl azophenol ester, and the chemical structural formula is:

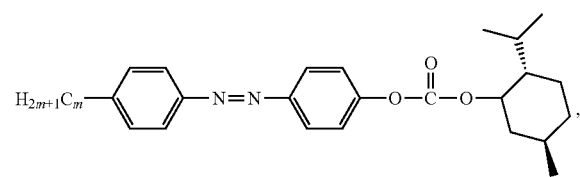

wherein, m is an integer chosen from 1 to 10.

The cholesteric liquid crystal polymerizable monomer is 2-methyle-1,4-bis(4-(6'-propyleneoxyhexyloxy)benzoyloxy)benzene, the chemical structural formula is:

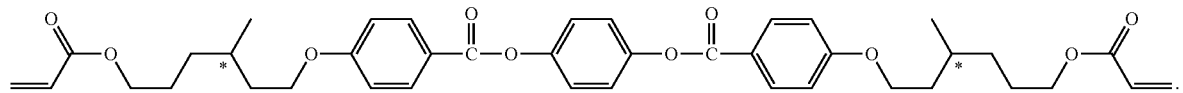 [SMILES: C=CC(=O)OCCCC(C)CCOc1ccc(C(=O)Oc2ccc(OC(=O)c3ccc(OCCC(C)CCCOC(=O)C=C)cc3)cc2)cc1]

The diglycidyl ether of bisphenol F is:

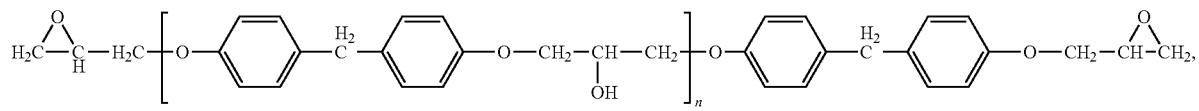

wherein, n is an integer chosen from 1 to 6.

The chemical structural formula of photoinitiator benzoin dimethyl ether is:

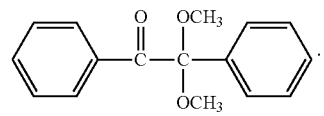

Figure 7:
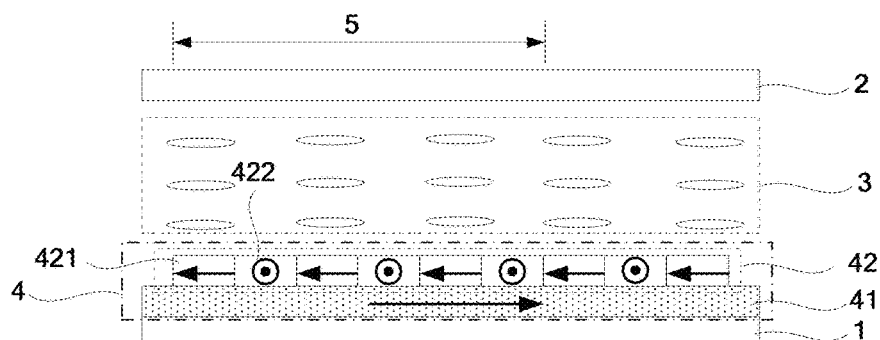
FIG. 7 is a structurally schematic view illustrating a liquid crystal panel provided by another embodiment of the present disclosure.

Based on the manufacturing method of another display panel as stated above, a liquid crystal panel is further provided by an embodiment of the present disclosure, as shown in FIG. 7. FIG. 7 is a structurally schematic view illustrating a liquid crystal panel provided by another embodiment of the present disclosure. The liquid crystal panel includes a first substrate 1 and a second substrate 2 that are cell-assembled, and a liquid crystal layer 3 disposed between the first substrate 1 and the second substrate 2. The first substrate 1 has an alignment layer 4 on a face facing the liquid crystal layer 3, and the alignment layer 4 includes:

a first alignment layer 41 covering a substrate surface;

and a second alignment layer 42 located on a face of the first alignment layer 41 facing the liquid crystal layer 3. The second alignment layer 42 is a cholesteric liquid crystal polymer alignment layer containing a chiral azobenzene compound. In correspondence with each column pixel area, the second alignment layer 42 has first alignment units 421 and second alignment units 422 that penetrate the column pixel areas and are arranged separately. The first alignment units 421 and the second alignment units 422 have different alignment directions. For example, the first alignment units and the second alignment units in the second alignment layer are arranged adjacently, and have different alignment directions.

In the technical solution according to embodiments of the present disclosure, by means of forming a second alignment layer 42 with different alignment directions on a first alignment layer 41 of a first substrate, within one pixel area, liquid crystal molecules in direct contact with first alignment units 421 are initially aligned in the alignment direction of it. While liquid crystal molecules in direct contact with second alignment units 422 are initially aligned in an alignment direction different from the first alignment direction. Thus, multiple initial alignments of liquid crystal molecules are formed within one pixel area, and liquid crystal multi-domain display is realized. In addition, the mixture layer may be subjected to ultraviolet illumination many times with multiple masks. The irradiation time for each time differs, and thus chiral azobenzene compounds in different regions have different structure. Consequently, a cholesteric liquid crystal polymer alignment layer with different alignment directions in adjacent regions is formed, and liquid crystal multi-domain display is realized.

According to an embodiment of the present disclosure, there is further provided a display apparatus, which includes the liquid crystal panel as stated in any of the above embodiments.

In the display apparatus according to embodiments of the present disclosure, owing to the fact that multi-domain display can be formed by any of the above liquid crystal panels, the manufacturing process is simple. Thus, multi-domain display can also be realized by the display apparatus, and the manufacturing process is simple.

For example, the display apparatus may be an electronic paper, a liquid crystal display or other display device as well as a television, a digital photo frame, a cell phone, a watch, a tablet computer, a notebook computer, a navigator or any other product or component having a display function that includes these display devices.

Hereinafter, the alignment principle of the second alignment layer in the technical solution according to embodiments of the present disclosure will be explained. In the technical solution according to embodiments of the present disclosure, the following chiral azobenzene compound is employed:

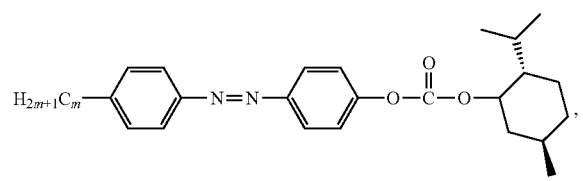

wherein, m is an integer chosen from 1 to 10.

Figure 8:
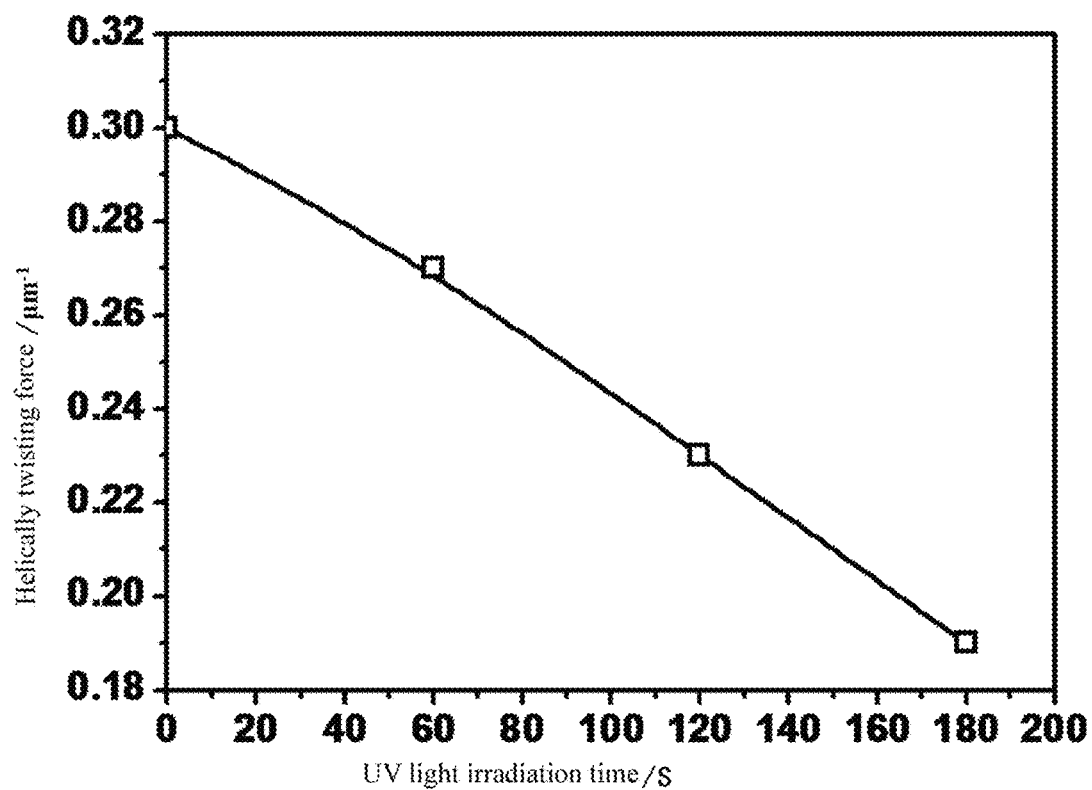
FIG. 8 is a variation curve of a helically twisting power of an m=6 chiral azobenzene compound versus ultraviolet illumination time.

The chiral azobenzene compound possesses the cis-trans-isomerism. The molecule looks like a rod at normal state, is trans-structure, and similar to structure of a liquid crystal molecule, so that arrangement of principal molecules of liquid crystal can be stabilized. When it is irradiated by ultraviolet light, the chiral azobenzene molecule will be transformed from the trans-structure into a forniciform cis-structure. With respect to the chiral azobenzene compound used in the technical solution according to embodiments of the present disclosure, as the time of ultraviolet illumination increases, it is transformed from trans-structure into cis-structure gradually, and the helically twisting power decreased gradually. FIG. 8 is a variation curve of helically twisting power of m=6 chiral azobenzene compound versus the time of ultraviolet irradiation. As shown in FIG. 8, the horizontal coordinate is UV irradiation time, and the unit is second (S); and the longitudinal coordinate is helically twisting power (HTP), and the unit is µm-1. As can been seen from FIG. 8, when the UV irradiation time increases gradually from 0 second to 180 seconds, the value of helically twisting power of the m=6 chiral azobenzene compound decreases from an initial 0.3 µm-1 to 0.19 µm-1. Accordingly, the screw pitch of a mixture layer added with the chiral azobenzene compound of this kind gradually increases as the UV irradiation time increases. As such, when a mixture layer containing chiral azobenzene compound is subjected to UV irradiation for different times, different screw-pitches will be formed.

Figure 9A:
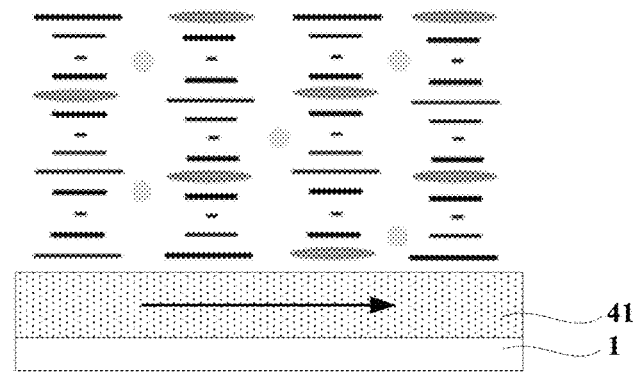
FIG. 9a is a structurally schematic view illustrating a first substrate after a mixture layer is coated on a first alignment layer.
Figure 9B:
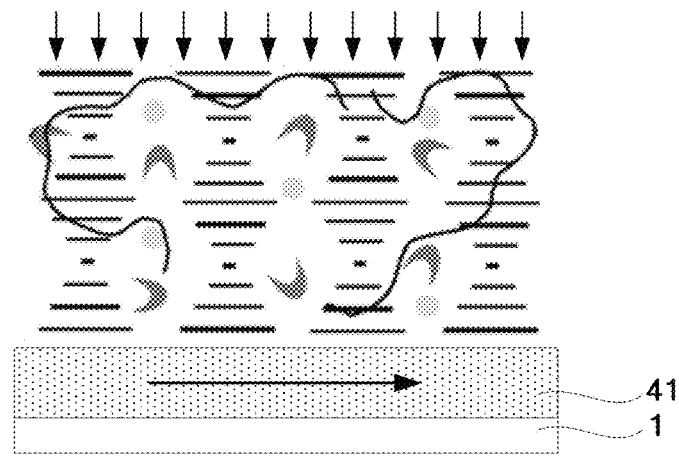
FIG. 9b is a structurally schematic view illustrating a first substrate after a mixture layer is subjected to ultraviolet illustration.
Figure 9C:
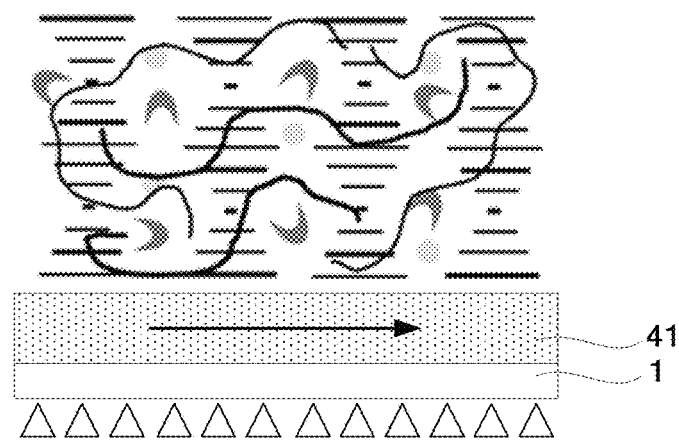
FIG. 9c is a structurally schematic view illustrating a first substrate after a mixture layer is heated.
Figure 9D:
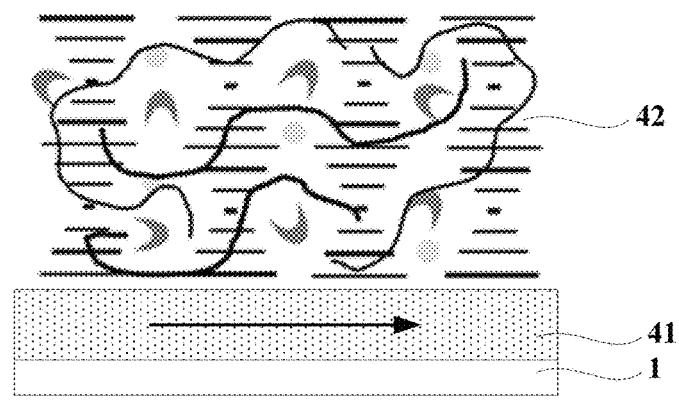
FIG. 9d is a structurally schematic view illustrating a first substrate with a second alignment layer formed thereon.

FIG. 9a to FIG. 9d are schematic views illustrating a manufacturing procedure of a cholesteric liquid crystal polymer alignment layer containing a chiral azobenzene compound. A mixture used in the cholesteric liquid crystal polymer alignment layer containing the chiral azobenzene compound includes a chiral azobenzene compound, a cholesteric liquid crystal polymerizable monomer, a photoinitiator, and a thermally polymerizable monomer. As shown in FIG. 9a, it is a structurally schematic view illustrating a first substrate after a mixture layer is coated on a first alignment layer. A layer of above mixture is coated on the first alignment layer 41 (i.e. a conventional alignment layer) of the first substrate 1, namely, a mixture layer is formed. Wherein, the chiral azobenzene compound exists in a trans-structure (e.g., an ellipse in FIG. 9a). Owing to the aligning function of the first alignment layer 41, cholesteric liquid crystal polymerizable monomers in the mixture layer will be arranged in the alignment direction of the first alignment layer 41 (i.e. the arrow direction in the first alignment layer 41), and thus an initial thread-pitch is formed. As shown in FIG. 9b, it is a structurally schematic view illustrating a first substrate after the mixture layer is subjected to UV irradiation. After the mixture layer is subjected to UV irradiation (the arrow in the upper part of FIG. 9b represents ultraviolet light), the chiral azobenzene compound with trans-structure will bend gradually to form a cis chiral azobenzene compound (a crescent in FIG. 9b). Its helically twisting power will decrease, and the screw pitch increases accordingly. Meanwhile cholesteric liquid crystal polymerizable monomers crease a polymerization reaction, to generate a cholesteric liquid crystal polymer (a thin curve in FIG. 9b). As shown in FIG. 9c, which is a structurally schematic view illustrating a first substrate after the mixture layer is heated. In order to further stabilize the screw pitch, it is heated at a set temperature, so that thermally polymerizable monomers in the mixture layer undergo a polymerization reaction, to form a polymer (a thick curve in FIG. 9c). As shown in FIG. 9d, which is a structurally schematic view illustrating a first substrate with a second alignment layer formed thereon, after the first substrate is cooled to room temperature, a second alignment layer 42 is formed, wherein the screw-pitch size does not change any more.

Regarding the alignment direction of a cholesteric liquid crystal polymer alignment layer containing a chiral azobenzene compound, namely, the arrangement direction of its surface molecules, it is affected by content of each of a chiral azobenzene compound, a cholesteric liquid crystal polymerizable monomer, a thermally polymerizable monomer and a photoinitiator in a mixture layer, UV polymerizing time and thickness of the alignment layer (d). Because the chiral azobenzene compound possesses the chirality and the helically twisting power is relatively large, the screw-pitch (P) of the mixture decreases as content of the chiral azobenzene compound increases, and increases as content of the chiral azobenzene compound decreases. When content of the cholesteric liquid crystal polymerizable monomer, thickness of the cholesteric liquid crystal polymer alignment layer and UV irradiation time are constant, arrangement direction of surface molecules of the alignment layer changes when the content of the chiral azobenzene compound and the screw-pitch changes. That is, its alignment direction changes.

Because the cholesteric liquid crystal polymerizable monomer possess chirality, screw-pitch (P) of the mixture layer decreases as content of the cholesteric liquid crystal polymerizable monomer increases, and increases as the cholesteric liquid crystal polymerizable monomer decreases. When content of the chiral azobenzene compound, thickness of the cholesteric liquid crystal polymer alignment layer and UV irradiation time are constant, arrangement direction of surface molecules of the alignment layer changes accordingly when the content of the cholesteric liquid crystal polymerizable monomer and the screw-pitch changes. That is, its alignment direction changes.

Figure 10A:
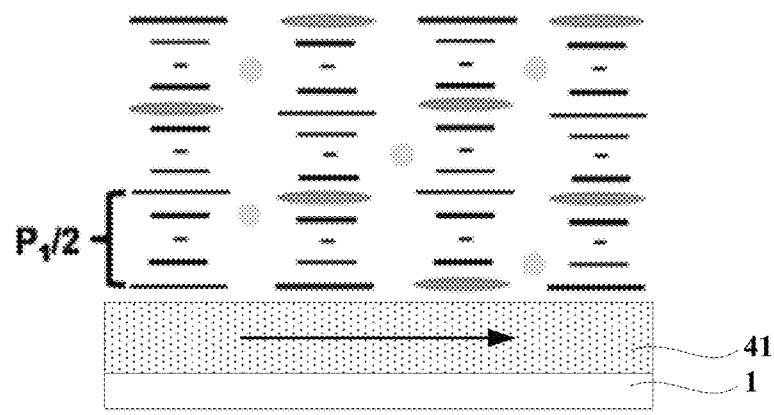
FIG. 10a is a structurally schematic view illustrating a first substrate that includes a second alignment layer not being irradiated by ultraviolet light.
Figure 10B:
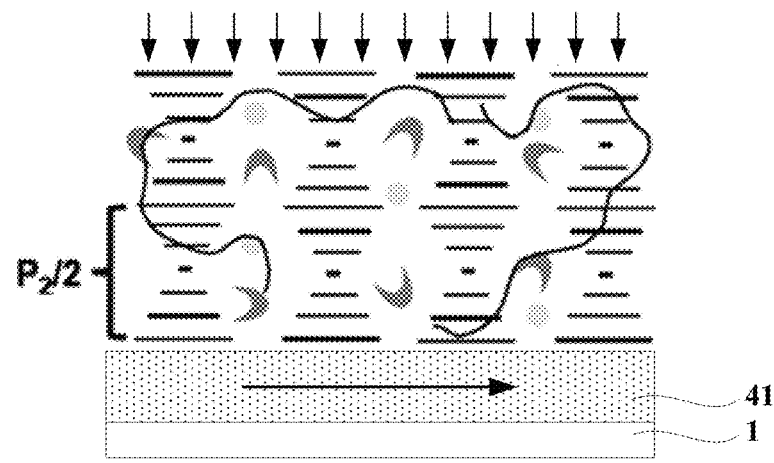
FIG. 10b is a structurally schematic view illustrating a first substrate that includes a second alignment layer subjected to ultraviolet light irradiation for a first preset duration.
Figure 10C:
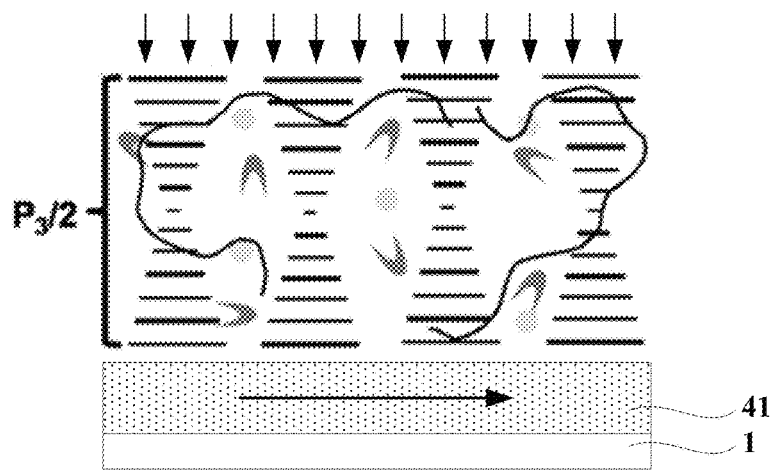
FIG. 10c is a structurally schematic view illustrating a first substrate that includes a second alignment layer subjected to ultraviolet light irradiation for a second preset duration.
Figure 10D:
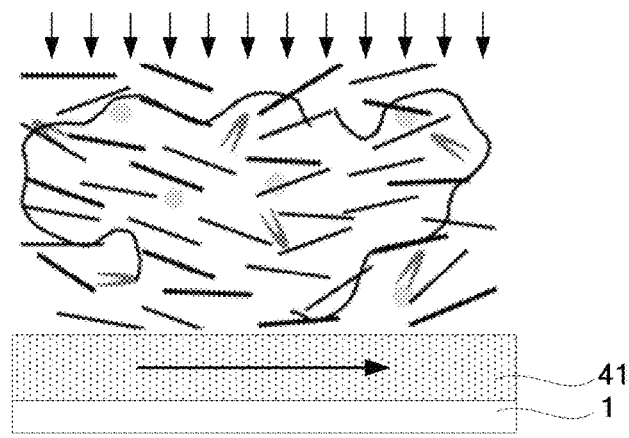
FIG. 10d is a structurally schematic view illustrating a first substrate that includes a second alignment layer subjected to ultraviolet light irradiation for a fourth preset duration.

When content of chiral azobenzene compound in the mixture, content of the cholesteric liquid crystal polymerizable monomer and thickness of the alignment layer are constant, alignment direction of the cholesteric liquid crystal polymer alignment layer is affected by UV irradiation time. Along with increasing of the UV irradiation time, as the helically twisting power of the chiral azobenzene compound decreases gradually (as shown in FIG. 8), the screw-pitch of the mixture layer gradually increases accordingly. As a result, when content of chiral azobenzene compound, content of the cholesteric liquid crystal polymerizable monomer and thickness of the alignment layer are constant, arrangement direction of surface molecules of the alignment layer changes accordingly when the UV irradiation time and screw-pitch of the mixture layer increases gradually. That is, its alignment direction changes. FIG. 10*a* to FIG. 10*d* are schematic views illustrating the screw-pitch variation of the mixture layer along with increasing of UV irradiation time. FIG. 10*a* is a structurally schematic view illustrating a first substrate including a second alignment layer that is not irradiated by ultraviolet light. As can be seen from FIG. 10*a*, an initial screw-pitch is P1, and is relatively small. FIG. 10*b* is a structurally schematic view illustrating a first substrate including a second alignment layer that is irradiated by ultraviolet light for a set first duration. As can be seen from FIG. 10*b*, the screw-pitch is P2, and is larger than screw-pitch P1. FIG. 10*c* is a structurally schematic view illustrating a first substrate including a second alignment layer that is irradiated by ultraviolet light for a set second duration. As can be seen from FIG. 10*c*, the screw-pitch is P3, and is relatively large. As can be seen from FIG. 10*a* to FIG. 10*c*, as the UV irradiation time increases gradually, a chiral azobenzene compound will be gradually transformed from a trans-structure into a forniciform cis-structure, and screw-pitch of the mixture layer increases gradually. As shown in FIG. 10*d*, it is a structurally schematic view illustrating a first substrate including a second alignment layer that is irradiated by ultraviolet light for a set fourth duration. Wherein, the fourth duration is larger than the third duration. When the UV irradiation time is long enough, the chiral azobenzene compound is transformed completely into a cis-structure, so that the mixture layer appears in an isotropic state. At this time, molecules in the mixture are arranged out of order, and an alignment layer cannot be formed.

Figure 11:
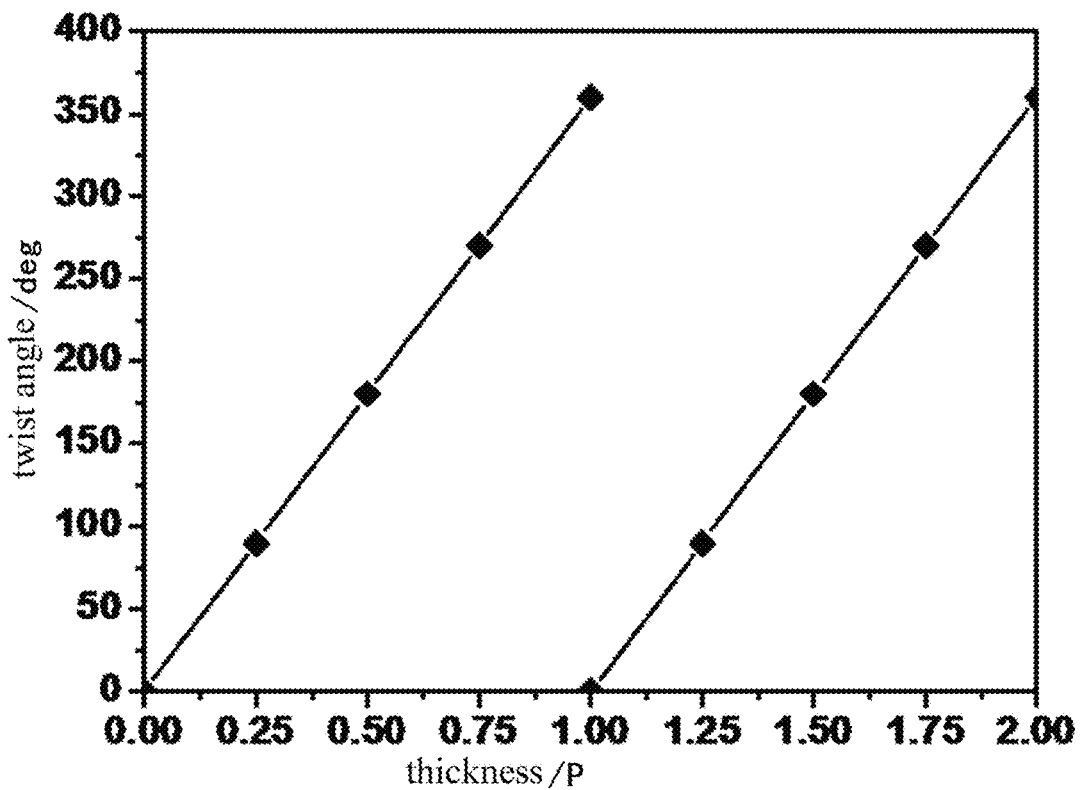
FIG. 11 is a variation curve graph of a twist angle of an alignment direction of a cholesteric liquid crystal polymer alignment layer containing a chiral azobenzene compound with respect to an alignment direction of a first alignment layer versus the film layer thickness of the cholesteric liquid crystal polymer alignment layer containing the chiral azobenzene compound.

In the case that content of chiral azobenzene compound in the mixture, content of the cholesteric liquid crystal polymerizable monomer and UV irradiation time are constant, namely, the screw-pitch (P) is constant, as thickness (d) changes, the alignment direction of the second alignment layer also changes along with it. FIG. 11 is a variation curve graph of a twist angle of an alignment direction of a cholesteric liquid crystal polymer alignment layer containing a chiral azobenzene compound with respect to an alignment direction of a first alignment layer versus the film layer thickness of the cholesteric liquid crystal polymer alignment layer containing the chiral azobenzene compound. As shown in FIG. 11, the longitudinal coordinate is Twist Angle (the unit is degree (deg)), and the horizontal coordinate is Thickness (the unit is screw-pitch (P)). As can be seen from FIG. 11, along with increasing of thickness of the cholesteric liquid crystal polymer alignment layer (i.e. the second alignment layer) containing a chiral azobenzene compound, alignment direction of the second alignment layer gradually rotates by a certain angle with respect to alignment direction of a first alignment layer, and a cyclic change from 0 degree to 360 degrees is formed. In order to describing the change more clearly, introduction will be given below in conjunction with FIG. 12*a* to FIG. 12*d*.

Figure 12A:
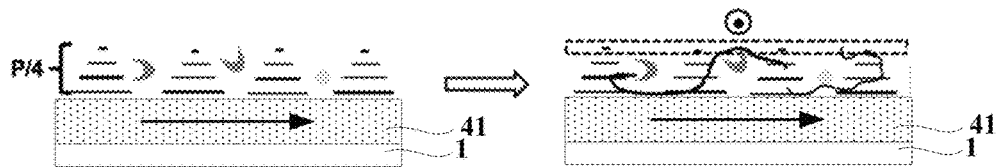
FIG. 12a is a structurally schematic view illustrating a liquid crystal panel in which an alignment direction of a cholesteric liquid crystal polymer alignment layer containing a chiral azobenzene compound and an alignment direction of a first alignment layer differs by 90 degrees.

FIG. 12*a* is a structurally schematic view illustrating a liquid crystal panel in which an alignment direction of a cholesteric liquid crystal polymer alignment layer containing a chiral azobenzene compound and an alignment direction of a first alignment layer differs by 90 degrees. A schematic view in the left side of FIG. 12*a* shows one alignment unit of a liquid crystal panel, and it can be seen that, a first alignment layer 41 and a mixture layer are coated on a first substrate 1, and the alignment direction of the first alignment layer 41 is denoted by the direction of an arrow within the first alignment layer 41. A schematic view in the right side of FIG. 12*a* is a structurally schematic view illustrating a liquid crystal panel formed after the liquid crystal panel in the left side of FIG. 12*a* is subjected to UV irradiation and heating. As can be seen from FIG. 12*a*, when thickness of the second alignment layer d=(n+0.25)P (n is an integer), alignment direction of an aligning unit of a cholesteric liquid crystal polymer alignment layer containing a chiral azobenzene compound makes an angle of 90 degrees with alignment direction of the first alignment layer 41.

Figure 12B:
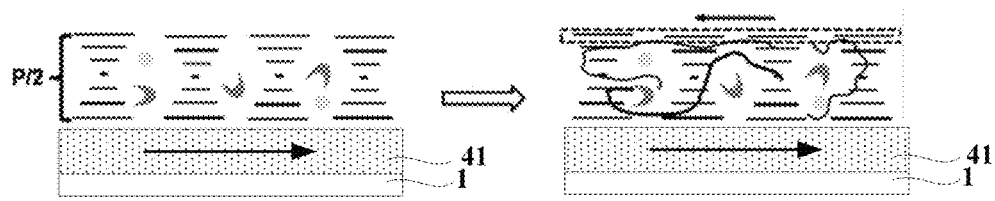
FIG. 12b is a structurally schematic view illustrating a liquid crystal panel in which an alignment direction of a cholesteric liquid crystal polymer alignment layer containing a chiral azobenzene compound and an alignment direction of a first alignment layer differs by 180 degrees.

As shown in FIG. 12*b*, it is a structurally schematic view illustrating a liquid crystal panel in which an alignment direction of a cholesteric liquid crystal polymer alignment layer containing a chiral azobenzene compound and an alignment direction of a first alignment layer differs by 180 degrees. A schematic view in the left side of FIG. 12*b* shows one alignment unit of a liquid crystal panel, and it can be seen that, a first alignment layer 41 and a mixture layer are coated on a first substrate 1, and the alignment direction of the first alignment layer 41 is denoted by the direction of an arrow within the first alignment layer 41. A schematic view in the right side of FIG. 12*b* is a structurally schematic view illustrating a liquid crystal panel formed after the liquid crystal panel in the left side of FIG. 12*b* is subjected to UV irradiation and heating. As can be seen from FIG. 12*b*, when thickness of the second alignment layer d=(n+0.5)P (n is an integer), alignment direction of an aligning unit of a cholesteric liquid crystal polymer alignment layer (the second alignment layer) containing a chiral azobenzene compound makes an angle of 180 degrees with alignment direction of the first alignment layer 41.

Figure 12C:
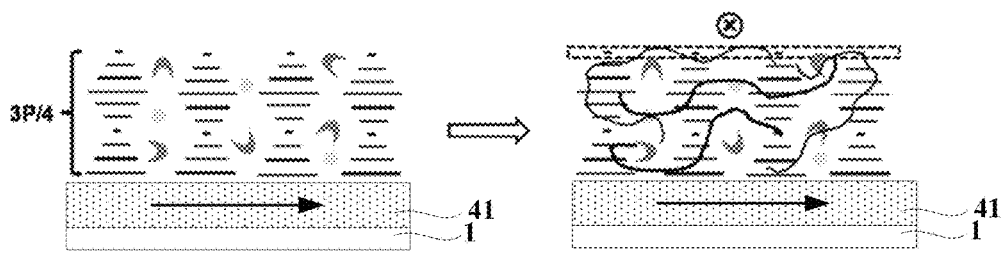
FIG. 12c is a structurally schematic view illustrating a liquid crystal panel in which an alignment direction of a cholesteric liquid crystal polymer alignment layer containing a chiral azobenzene compound and an alignment direction of a first alignment layer differs by 270 degrees.

As shown in FIG. 12*c*, it is a structurally schematic view illustrating a liquid crystal panel in which an alignment direction of a cholesteric liquid crystal polymer alignment layer containing a chiral azobenzene compound and an alignment direction of a first alignment layer differs by 270 degrees. A schematic view in the left side of FIG. 12*c* shows one alignment unit of a liquid crystal panel, and it can be seen that, a first alignment layer 41 and a mixture layer are coated on a first substrate 1. The alignment direction of the first alignment layer 41 is denoted by the direction of an arrow within the first alignment layer 41. A schematic view in the right side of FIG. 12*c* is a structurally schematic view illustrating a liquid crystal panel formed after the liquid crystal panel in the left side of FIG. 12*c* is subjected to UV irradiation and heating. As can be seen from FIG. 12*c*, when thickness of the second alignment layer d=(n+0.75)P (n is an integer), alignment direction of an aligning unit of a cholesteric liquid crystal polymer alignment layer (the second alignment layer) containing a chiral azobenzene compound makes an angle of 270 degrees with alignment direction of the first alignment layer 41.

Figure 12D:
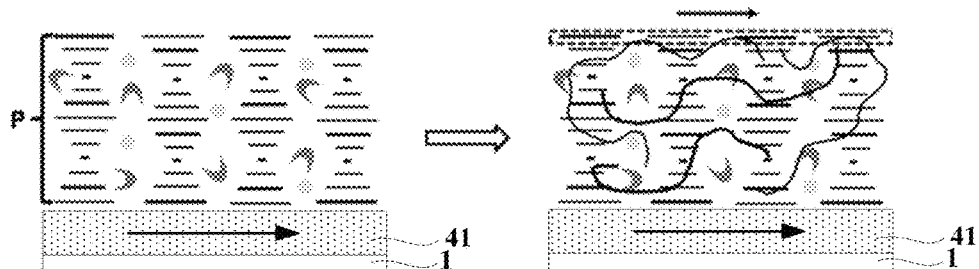
FIG. 12d is a structurally schematic view illustrating a liquid crystal panel in which an alignment direction of a cholesteric liquid crystal polymer alignment layer containing a chiral azobenzene compound and an alignment direction of a first alignment layer differs by 360 degrees.

As shown in FIG. 12*d*, it is a structurally schematic view illustrating a liquid crystal panel in which an alignment direction of a cholesteric liquid crystal polymer alignment layer containing a chiral azobenzene compound and an alignment direction of a first alignment layer differs by 360 degrees. A schematic view in the left side of FIG. 12*d* shows one alignment unit of a liquid crystal panel, and it can be seen that, a first alignment layer 41 and a mixture layer are coated on a first substrate 1. The alignment direction of the first alignment layer 41 is denoted by the direction of an arrow within the first alignment layer 41. A schematic view in the right side of FIG. 12*d* is a structurally schematic view illustrating a liquid crystal panel formed after the liquid crystal panel in the left side of FIG. 12*d* is subjected to UV irradiation and heating. As can be seen from FIG. 12*d*, when thickness of the second alignment layer d=nP (n is an integer), alignment direction of an aligning unit of a cholesteric liquid crystal polymer alignment layer (the second alignment layer) containing a chiral azobenzene compound makes an angle of 360 degrees with alignment direction of the first alignment layer 41. That is, within the aligning unit, the first alignment layer and the second alignment layer have the same alignment direction.

According to one embodiment of the present disclosure, by means of designing two alignment layers in contact with a liquid crystal layer within one pixel area to have different alignments in a liquid crystal panel according to embodiments of the present disclosure, a multi-domain display can be achieved by the liquid crystal panel according to embodiments of the present disclosure. On the grounds that Size of aligning units 420 of the cholesteric liquid crystal polymer alignment layer (second alignment layer) containing a chiral azobenzene compound differ as shown in FIG. 8, display with domains of two, three, six and more of the liquid crystal panel can be realized. Hereinafter, it will be described in conjunction with FIG. 13*a* to FIG. 13*d*, wherein, as regards a first alignment layer and a second alignment layer in FIG. 13*a* to FIG. 13*d*, multi-domain display can be achieved only if they satisfy such a condition that alignment directions of the two are different. Wherein, alignment directions of the first alignment layer and the second alignment layer are denoted by the directions of arrows within them, respectively.

Figure 13A:
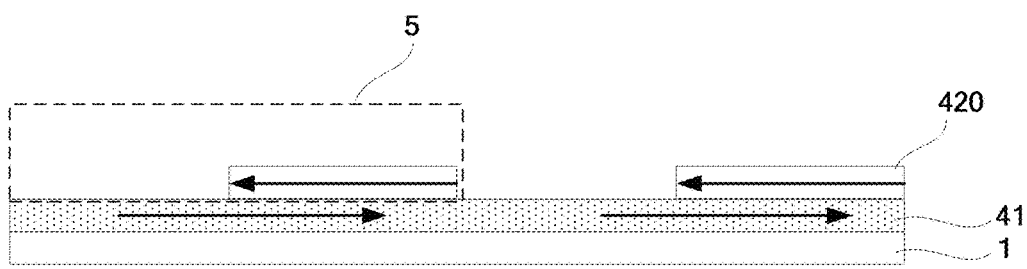
FIG. 13a is a structurally schematic view illustrating a liquid crystal panel with two-domain display according to an embodiment of the present disclosure.

As shown in FIG. 13*a*, it is a structurally schematic view illustrating a liquid crystal panel with two-domain display according to an embodiment of the present disclosure. For the sake of displaying clearly, only a first substrate 1, a first alignment layer 41 and aligning units 420 of a second alignment layer are given in FIG. 13*a*, and the common structure may be used for other structure of the liquid crystal panel. No limit will be set in embodiments of the present disclosure. When a width of each of the aligning unit 420 of a cholesteric liquid crystal polymer alignment layer (the second alignment layer) containing a chiral azobenzene compound is half of a width of a single pixel area 5, half of liquid crystal molecules in each pixel area 5 directly contact the first alignment layer 41, and the other half directly contact the second alignment layer. Thus, two initial arrangements of liquid crystal molecules are formed. That is, a two-domain liquid crystal display is realized.

Figure 13B:
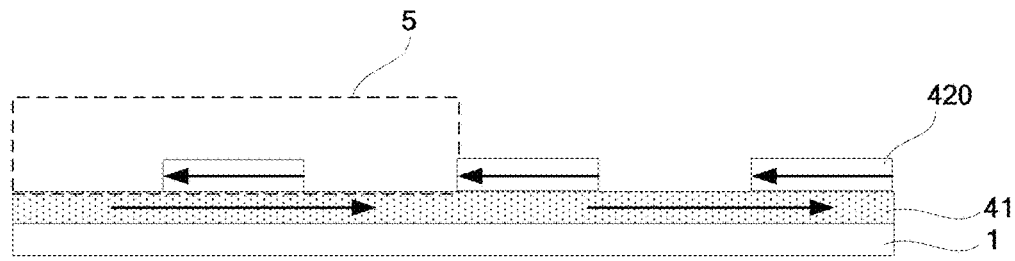
FIG. 13b is a structurally schematic view illustrating a liquid crystal panel with three-domain display according to an embodiment of the present disclosure.

As shown in FIG. 13*b*, it is a structurally schematic view illustrating a liquid crystal panel with three-domain display according to an embodiment of the present disclosure. For the sake of displaying clearly, only a first substrate 1, a first alignment layer 41 and aligning units 420 of a second alignment layer are given in FIG. 13*b*, and the common structure may be used for other structure of the liquid crystal panel. No limit will be set in embodiments of the present disclosure. When a width of each of the aligning unit 420 of a cholesteric liquid crystal polymer alignment layer (the second alignment layer) containing a chiral azobenzene compound is ⅓ of a width of a single pixel area 5, three initial arrangements of liquid crystal molecules can be formed within single pixel area 5. Thus, a three-domain liquid crystal display is realized.

Figure 13C:
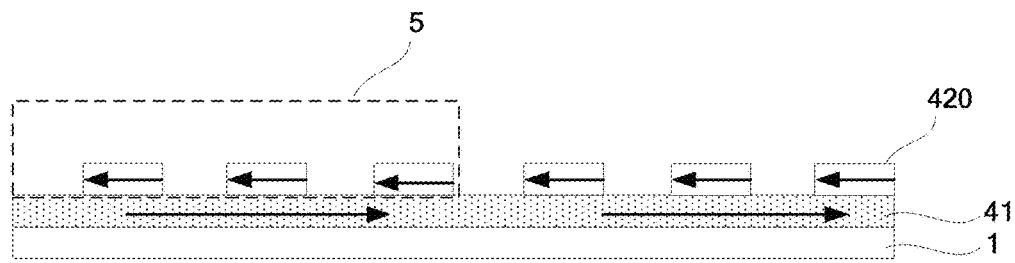
FIG. 13c is a structurally schematic view illustrating a liquid crystal panel with six-domain display according to an embodiment of the present disclosure.

As shown in FIG. 13*c*, it is a structurally schematic view illustrating a liquid crystal panel with six-domain display according to an embodiment of the present disclosure. For the sake of displaying clearly, only a first substrate 1, a first alignment layer 41 and aligning units 420 of a second alignment layer are given in FIG. 13*c*, and the common structure may be used for other structure of the liquid crystal panel. No limit will be set in embodiments of the present disclosure. When a width of each of the aligning unit 420 of a cholesteric liquid crystal polymer alignment layer (the second alignment layer) containing a chiral azobenzene compound is ⅙ of a width of a single pixel area 5, six initial arrangements of liquid crystal molecules can be formed within each pixel. Thus, a six-domain liquid crystal display is realized.

Figure 13D:
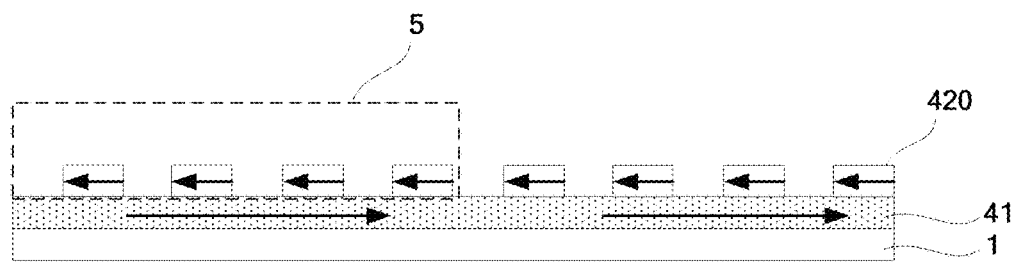
FIG. 13d is a structurally schematic view illustrating a liquid crystal panel with multi-domain display according to an embodiment of the present disclosure.

As shown in FIG. 13*d*, it is a structurally schematic view illustrating a liquid crystal panel with multi-domain display according to an embodiment of the present disclosure. For the sake of displaying clearly, only a first substrate 1, a first alignment layer 41 and aligning units 420 of a second alignment layer are given in FIG. 13*d*, and the common structure may be used for other structure of the liquid crystal panel. No limit will be set in embodiments of the present disclosure. When a width of each of the aligning unit 420 of a cholesteric liquid crystal polymer alignment layer (the second alignment layer) containing a chiral azobenzene compound is 1/n of a width of a single pixel area 5, initial arrangements of n types of liquid crystal molecules can be formed within each pixel. Thus, a multi-domain liquid crystal display is realized. It is shown in FIG. 13*d* that n is 8, and n may also be 9, 10, 11 or the like. As long as the process permits, no limit will be set to the n value.

Size of each aligning unit in a cholesteric liquid crystal polymer alignment layer (the second alignment layer) containing a chiral azobenzene compound can be adjusted with the aid of size of an opening of a mask.

For example, by means of designing different aligning units of a second alignment layer in contact with a liquid crystal layer within one pixel area to have different alignments in a liquid crystal panel according to embodiments of the present disclosure, a multi-domain display can be achieved by the liquid crystal panel according to embodiments of the present disclosure. On the grounds that Size of first aligning units and first aligning units of a cholesteric liquid crystal polymer alignment layer (second alignment layer) containing a chiral azobenzene compound differ as shown in FIG. 8, display with domains of two, three, six and more of the liquid crystal panel can be realized. Hereinafter, it will be described in conjunction with FIG. 14*a* to FIG. 14*d*, wherein, as regards first aligning units 421 and second aligning units 422 in a second alignment layer in FIG. 14*a* to FIG. 14*d*, multi-domain display can be achieved only if they satisfy such a condition that alignment directions of the two are different. Wherein, alignment directions of the first alignment layer, first aligning units and second aligning units are denoted by the directions of arrows within them, respectively.

Figure 14A:
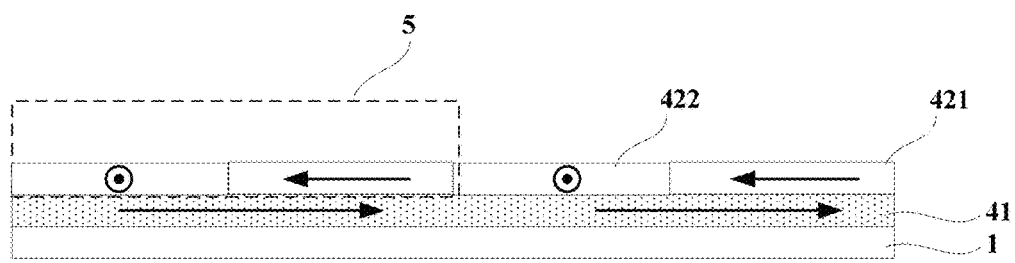
FIG. 14a is a structurally schematic view illustrating a liquid crystal panel with two-domain display according to another embodiment of the present disclosure.

As shown in FIG. 14*a*, it is a structurally schematic view illustrating a liquid crystal panel with two-domain display according to another embodiment of the present disclosure. For the sake of displaying clearly, only a first substrate 1, a first alignment layer 41 and first aligning units 421 and second aligning units 422 of a second alignment layer are given in FIG. 14a, and the common structure may be used for other structure of the liquid crystal panel. No limit will be set in embodiments of the present disclosure. When widths of the first aligning unit 421 and the second aligning units 422 of a cholesteric liquid crystal polymer alignment layer (the second alignment layer) containing a chiral azobenzene compound are each half of a width of a single pixel area 5, half of liquid crystal molecules in each pixel area 5 directly contact the first aligning units 421, and the other half directly contact the second aligning unit 422. Thus, two initial arrangements of liquid crystal molecules are formed. That is, a two-domain liquid crystal display is realized.

Figure 14B:
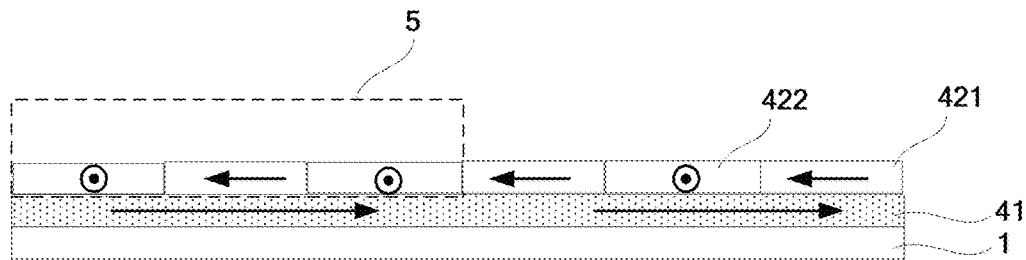
FIG. 14b is a structurally schematic view illustrating a liquid crystal panel with three-domain display according to another embodiment of the present disclosure.

As shown in FIG. 14b, it is a structurally schematic view illustrating a liquid crystal panel with three-domain display according to another embodiment of the present disclosure. For the sake of displaying clearly, only a first substrate 1, a first alignment layer 41 and first aligning units 421 and second aligning units 422 of a second alignment layer are given in FIG. 14b, and the common structure may be used for other structure of the liquid crystal panel. No limit will be set in embodiments of the present disclosure. When widths of the first aligning unit 421 and the second aligning units 422 of a cholesteric liquid crystal polymer alignment layer (the second alignment layer) containing a chiral azobenzene compound are each ⅓ of a width of a single pixel area 5, as the first aligning units 421 and the second aligning units 422 have different alignment directions, three initial arrangements of liquid crystal molecules can be formed within each pixel area 5. Thus, a three-domain liquid crystal display is realized.

Figure 14C:
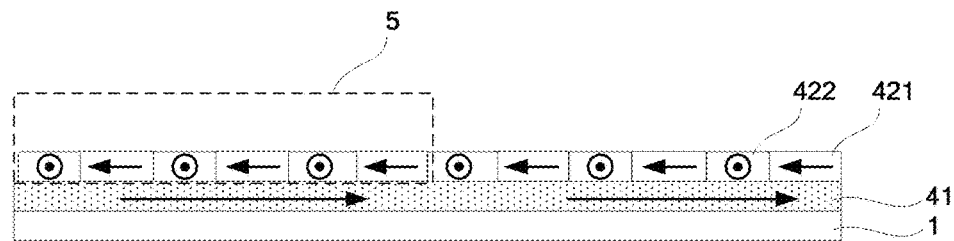
FIG. 14c is a structurally schematic view illustrating a liquid crystal panel with six-domain display according to another embodiment of the present disclosure.

As shown in FIG. 14c, it is a structurally schematic view illustrating a liquid crystal panel with six-domain display according to another embodiment of the present disclosure. For the sake of displaying clearly, only a first substrate 1, a first alignment layer 41 and first aligning units 421 and second aligning units 422 of a second alignment layer are given in FIG. 14c, and the common structure may be used for other structure of the liquid crystal panel. No limit will be set in embodiments of the present disclosure. When widths of the first aligning unit 421 and the second aligning units 422 of a cholesteric liquid crystal polymer alignment layer (the second alignment layer) containing a chiral azobenzene compound are each ⅙ of a width of a single pixel area 5, as the first aligning units 421 and the second aligning units 422 have different alignment directions, six initial arrangements of liquid crystal molecules can be formed within each pixel. Thus, a six-domain liquid crystal display is realized.

Figure 14D:
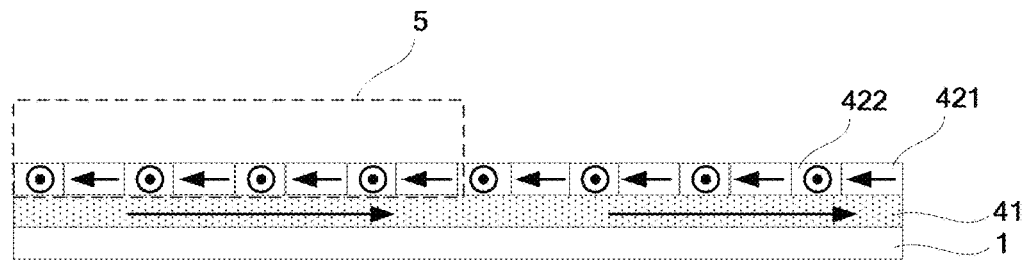
FIG. 14d is a structurally schematic view illustrating a liquid crystal panel with multi-domain display according to another embodiment of the present disclosure.

As shown in FIG. 14d, it is a structurally schematic view illustrating a liquid crystal panel with multi-domain display according to another embodiment of the present disclosure. For the sake of displaying clearly, only a first substrate 1, a first alignment layer 41 and first aligning units 421 and second aligning units 422 of a second alignment layer are given in FIG. 14d, and the common structure may be used for other structure of the liquid crystal panel. No limit will be set in embodiments of the present disclosure. When widths of the first aligning unit 421 and the second aligning units 422 of a cholesteric liquid crystal polymer alignment layer (the second alignment layer) containing a chiral azobenzene compound are each 1/n of a width of a single pixel area 5, initial arrangements of n types of liquid crystal molecules can be formed within each pixel. Thus, a multi-domain liquid crystal display is realized. It is shown in FIG. 14d that n is 8, and n may also be 9, 10, 11 or the like. As long as the process permits, no limit will be set to the n value.

For example, in a manufacturing method of the liquid crystal panel, in the case that a second alignment layer has multiple aligning units penetrating a column pixel area in correspondence with each column pixel area, the multiple aligning units have the same alignment direction (as shown in FIGS. 13b to d), or the multiple aligning units have different alignment directions (as shown in FIGS. 14b to d).

For example, in a manufacturing method of the liquid crystal panel, in the case that in multiple aligning units corresponding to each column pixel area, the multiple aligning units have the same alignment direction, the multiple aligning units are arranged separately (as shown in FIGS. 13b to d), namely, there is an interval between two adjacent aligning units.

For example, in a manufacturing method of the liquid crystal panel, in the case that in multiple aligning units corresponding to each column pixel area, the multiple aligning units have different alignment directions, the multiple aligning units with different alignment directions are arranged alternately (as shown in FIGS. 14b to d).

Sizes of a first aligning unit and a second aligning unit in a cholesteric liquid crystal polymer alignment layer (the second alignment layer) containing a chiral azobenzene compound can be adjusted with the aid of sizes of openings of a first mask and a second mask, respectively.

Figure 15:
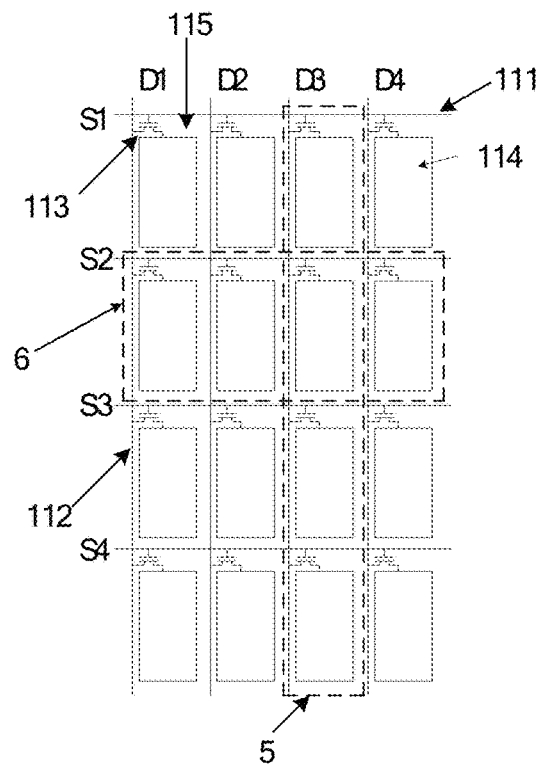
FIG. 15 is a schematic view illustrating a column pixel area and a row pixel area of a liquid crystal panel with multi-domain display according to an embodiment of the present disclosure.
Figure 16:
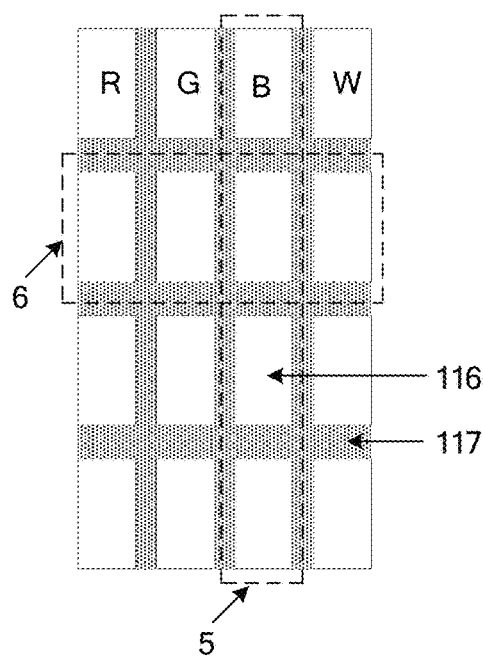
FIG. 16 is a schematic view illustrating a column pixel area and a row pixel area of a liquid crystal panel with multi-domain display according to another embodiment of the present disclosure.

It is to be noted that, in embodiments of the present disclosure, a first substrate and/or a second substrate each include multiple column pixel areas 5 and multiple row pixel areas 6, for example, as shown in FIG. 15 and FIG. 16. One column pixel area 5 or one row pixel area 6 includes multiple sub-pixels 115. For example, a first substrate or a second substrate includes multiple scan signal lines 111 and multiple data signal lines 112, and they crisscross over each other to form multiple sub-pixels 115 arranged in a matrix form, as shown in FIG. 15. For example, one sub-pixel 115 includes one data signal line 112, one scan signal line 111, one thin film transistor 113 and one pixel electrode 114. In this case, the sub-pixel may be located on an array substrate. Or, for example, one sub-pixel 51 includes one light filtering block 116, as shown in FIG. 16. For example, it includes one color filtering block or a white filtering block. For example, one pixel 51 includes one red (R) sub unit, green (G) sub unit, blue (B) sub unit or one white filtering block. In this case, the sub-pixel may be located on a counter substrate. Light filtering blocks may be separated by a black matrix. For example, sub-pixels on an array substrate and a counter substrate may correspond to each other on a one-to-one basis.

Hereinafter, several concrete embodiments will be listed for describing the manufacturing method of a liquid crystal panel according to embodiments of the present disclosure, but the present disclosure is not limited to the following embodiments.

Embodiment 1

An alignment layer covering a substrate surface and having an alignment direction along a first direction is formed on a first substrate. For example, the first substrate may be a glass substrate. Further, for example, the first substrate may be an array substrate or a counter substrate, and a first alignment layer is a conventional alignment layer, and may be made by way of rubbing. For example, a layer of a conventional aligning fluid is coated firstly on a first substrate (for example, a Polyimide (briefly called as PI) fluid is used as the aligning fluid), a solidification treatment is conducted on the first substrate with the aligning fluid coated thereon, so that the aligning fluid is formed into a solidified film, and then a rubbing treatment is conducted on the solidified film, so as to form a first alignment layer having an alignment direction along a first direction.

A second alignment layer having an alignment direction along a second direction is formed on the first alignment layer, and is a cholesteric liquid crystal polymer alignment layer containing a chiral azobenzene compound. In correspondence with each column pixel area, the second alignment layer has at least one aligning unit penetrating the column pixel areas, and a width of each aligning unit is smaller than a width of the column pixel area. For example, firstly, a chiral azobenzene compound with a mass fraction of 1.0%:

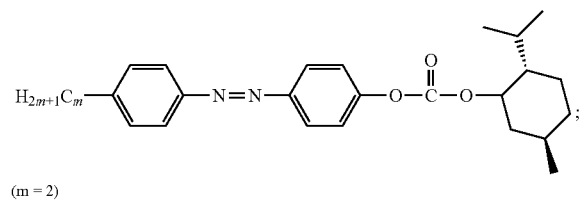

(m = 2)

a cholesteric liquid crystal polymerizable monomer with a mass fraction of 46.7%:

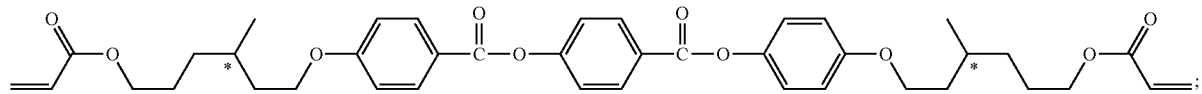 [SMILES: C=CC(=O)OCCCC(C)CCOc1ccc(OC(=O)c2ccc(OC(=O)c3ccc(OCCC(C)CCCOC(=O)C=C)cc3)cc2)cc1]

a thermally polymerizable monomer DGEBF with a mass fraction of 10.0%;

a thermally polymerizable monomer PACM with a mass fraction of 40.0%; and a photoinitiator

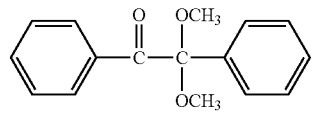

with a mass fraction of 2.3% are mixed evenly to obtain a mixture. The screw-pitch of this mixture increases gradually as the UV irradiation time increases. When the UV irradiation is 60 s, size of screw-pitch of the mixture is 1350 nm, and a layer of mixture with a thickness of 337.5 nm is evenly coated on the first alignment layer, which is operated avoiding light irradiation, so that a mixture layer is formed.

UV irradiation is conducted on the mixture layer via a mask, so that a portion of the mixture layer irradiated by UV light is formed to have an alignment along a second direction, and the mask has an opening in correspondence with each aligning unit. For example, with a mask and ultraviolet light with a light intensity of 5 mw/cm$^2$, the mixture layer is subjected to UV irradiation for 60 s. Because the helically twisting power of a chiral azobenzene compound of the irradiated portion will decrease, a helical structure with a pitch of 1350 nm is formed in the mixture layer accordingly. Meanwhile cholesteric liquid crystal polymerizable monomers of the irradiated portion undergo a cross-linking reaction to generate a cholesteric liquid crystal polymer, and this pitch is stabilized.

After that, the mixture layer is heated at 55° C. for 40 min, so that thermally polymerizable monomers DGEBF react with thermally polymerizable monomers PACM in the mixture to form a polymer, so as to further stabilize the pitch.

With the use of a dissolution method with solvent, cholesteric liquid crystal polymerizable monomers and thermally polymerizable monomers DGEBF as well as thermally polymerizable monomers PACM that are not irradiated by ultraviolet light (namely, not reacted) are removed with dichloromethane, so that a cholesteric liquid crystal polymer alignment layer with an alignment direction making an angle of 90 degrees with the alignment direction of a first alignment layer may be formed on the first alignment layer.

For example, an array substrate (i.e. a TFT substrate) and a Color Filter (briefly called as CF) substrate, on which liquid crystals and a sealant are dripped, are cell-assembled under vacuum, so as to produce a liquid crystal panel. In the liquid crystal panel, liquid crystal molecules in direct contact with the first alignment layer within one pixel are initially arranged in its alignment direction. While liquid crystal molecules in direct contact with the cholesteric liquid crystal polymer alignment layer are arranged in a direction that makes an angle of 90 degrees with the alignment direction of the first alignment layer. Consequently, multiple initial alignments of liquid crystal molecules are formed within one pixel, and a liquid crystal multi-domain display is realized.

Embodiment 2

An alignment layer covering a substrate surface and having an alignment direction along a first direction is formed on a first substrate. For example, the first substrate may be a glass substrate. Further, the first substrate may be an array substrate or a counter substrate, and a first alignment layer is a conventional alignment layer, and may be made by way of rubbing. For example, a layer of a conventional aligning fluid is coated firstly on a first substrate (for example, a Polyimide (briefly called as PI) fluid is used as the aligning fluid), a solidification treatment is conducted on the first substrate with the aligning fluid coated thereon, so that the aligning fluid is formed into a solidified film, and then a rubbing treatment is conducted on the solidified film, so as to form a first alignment layer having an alignment direction along a first direction.

A second alignment layer, which is a cholesteric liquid crystal polymer alignment layer containing a chiral azobenzene compound, having an alignment direction along a second direction is formed on the first alignment layer. In correspondence with each column pixel area, the second alignment layer has at least one aligning unit penetrating the column pixel areas, and a width of each aligning unit is smaller than a width of the column pixel area. For example, firstly, a chiral azobenzene compound with a mass fraction of 5.0%:

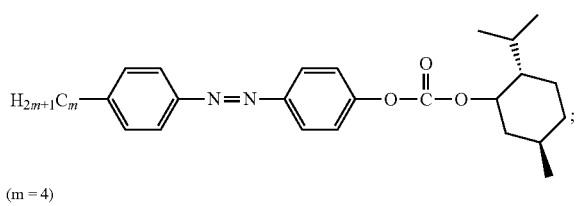

(m = 4)

a cholesteric liquid crystal polymerizable monomer with a mass fraction of 42.9%:

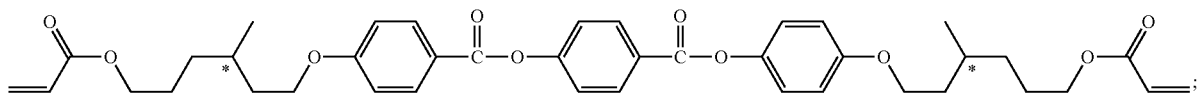

a thermally polymerizable monomer DGEBF with a mass fraction of 40.0%;
a thermally polymerizable monomer PACM with a mass fraction of 10.0%; and
a photoinitiator

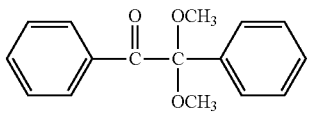

with a mass fraction of 2.1% are mixed evenly to obtain a mixture. The screw-pitch of this mixture increases gradually as the UV irradiation time increases. When the UV irradiation is 60 s, size of screw-pitch of the mixture is 960 nm, and a layer of mixture with a thickness of 480 nm is evenly coated on the first alignment layer, which is operated avoiding light irradiation, so that a mixture layer is formed.

UV irradiation is conducted on the mixture layer via a mask, so that a portion of the mixture layer irradiated by UV light is formed to have an alignment along a second direction, and the mask has an opening in correspondence with each aligning unit. For example, with a mask and ultraviolet light with a light intensity of 5 mw/cm$^2$, the mixture layer is subjected to UV irradiation for 60 s. As the helically twisting power of a chiral azobenzene compound of the irradiated portion will decrease, a helical structure with a pitch of 960 nm is formed in the mixture layer accordingly. Meanwhile cholesteric liquid crystal polymerizable monomers of the irradiated portion undergo a cross-linking reaction to generate a cholesteric liquid crystal polymer, and this pitch is stabilized.

After that, the mixture layer is heated at 45° C. for 60 min, so that thermally polymerizable monomers DGEBF react with thermally polymerizable monomers PACM in the mixture to form a polymer, so as to further stabilize the pitch.

With the use of a dissolution method with solvent, for example, cholesteric liquid crystal polymerizable monomers and thermally polymerizable monomers DGEBF as well as thermally polymerizable monomers PACM that are not irradiated by ultraviolet light (namely, not reacted) are removed with dichloromethane, so that a cholesteric liquid crystal polymer alignment layer with an alignment direction making an angle of 180 degrees with the alignment direction of a first alignment layer may be formed on the first alignment layer.

For example, a TFT substrate and a CF substrate, on which liquid crystals and a sealant are dripped, are cell-assembled under vacuum, so as to produce a liquid crystal panel. In the liquid crystal panel, liquid crystal molecules in direct contact with the first alignment layer within one pixel are initially arranged in its alignment direction. While liquid crystal molecules in direct contact with the cholesteric liquid crystal polymer alignment layer are arranged in a direction that makes an angle of 180 degrees with the alignment direction of the first alignment layer. Consequently, multiple initial alignments of liquid crystal molecules are formed within one pixel, and a liquid crystal multi-domain display is realized.

Embodiment 3

An alignment layer covering a substrate surface and having an alignment direction along a first direction is formed on a first substrate. For example, the first substrate may be a glass substrate, and further, for example, the first substrate may be an array substrate or a counter substrate. A first alignment layer is a conventional alignment layer, and may be made by way of rubbing. For example, a layer of a conventional aligning fluid is coated firstly on a first substrate (for example, a Polyvinyl alcohol (briefly called as PVA) fluid is used as the aligning fluid), a solidification treatment is conducted on the first substrate with the aligning fluid coated thereon, so that the aligning fluid is formed into a solidified film, and then a rubbing treatment is conducted on the solidified film, so as to form a first alignment layer having an alignment direction along a first direction.

A second alignment layer, which is a cholesteric liquid crystal polymer alignment layer containing a chiral azobenzene compound, having an alignment direction along a second direction is formed on the first alignment layer. In correspondence with each column pixel area, the second alignment layer has at least one aligning unit penetrating the column pixel areas, and a width of each aligning unit is smaller than a width of the column pixel area. For example, firstly, a chiral azobenzene compound with a mass fraction of 10.0%:

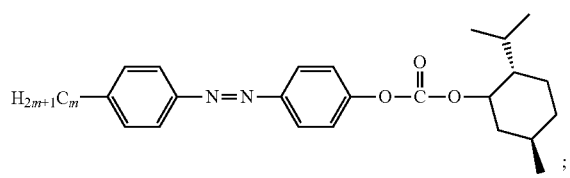

(m = 6)

a cholesteric liquid crystal polymerizable monomer with a mass fraction of 38.1%:

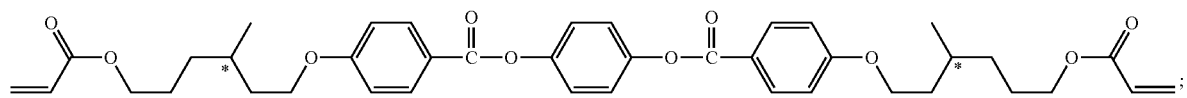 [SMILES: C=CC(=O)OCCCC(C)CCOc1ccc(OC(=O)c2ccc(OC(=O)c3ccc(OCCC(C)CCCOC(=O)C=C)cc3)cc2)cc1]

a thermally polymerizable monomer DGEBF with a mass fraction of 25.0%;

a thermally polymerizable monomer PACM with a mass fraction of 25.0%; and a photoinitiator

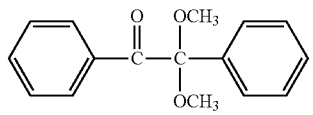

with a mass fraction of 1.9% are mixed evenly to obtain a mixture. The screw-pitch of this mixture increases gradually as the UV irradiation time increases. When the UV irradiation is 180 s, size of screw-pitch of the mixture is 850 nm, and a layer of mixture with a thickness of 637.5 nm is evenly coated on the first alignment layer, which is operated avoiding light irradiation, so that a mixture layer is formed.

UV irradiation is conducted on the mixture layer via a mask, so that a portion of the mixture layer irradiated by UV light is formed to have an alignment along a second direction, and the mask has an opening in correspondence with each aligning unit. For example, with a mask and ultraviolet light with a light intensity of 5 mw/cm$^2$, the mixture layer is subjected to UV irradiation for 180 s. As the helically twisting power of a chiral azobenzene compound of the irradiated portion will decrease, a helical structure with a pitch of 850 nm is formed in the mixture layer accordingly. Meanwhile cholesteric liquid crystal polymerizable monomers of the irradiated portion undergo a cross-linking reaction to generate a cholesteric liquid crystal polymer, and this pitch is stabilized.

After that, the mixture layer is heated at 40° C. for 60 min, so that thermally polymerizable monomers DGEBF react with thermally polymerizable monomers PACM in the mixture to form a polymer, so as to further stabilize the pitch.

With the use of a dissolution method with solvent, cholesteric liquid crystal polymerizable monomers and thermally polymerizable monomers that are not irradiated by ultraviolet light (namely, not reacted) are removed with dichloromethane, so that a cholesteric liquid crystal polymer alignment layer with an alignment direction making an angle of 270 degrees with the alignment direction of a first alignment layer may be formed on the first alignment layer.

A TFT substrate and a CF substrate, on which liquid crystals and a sealant are dripped, are cell-assembled under vacuum, so as to produce a liquid crystal panel. In the liquid crystal panel, liquid crystal molecules in direct contact with the first alignment layer within one pixel are initially arranged in its alignment direction. While liquid crystal molecules in direct contact with the cholesteric liquid crystal polymer alignment layer are arranged in a direction that makes an angle of 270 degrees with the alignment direction of the first alignment layer. Consequently, multiple initial alignments of liquid crystal molecules are formed within one pixel, and a liquid crystal multi-domain display is realized.

Embodiment 4

A first alignment layer covering a substrate surface is formed on a first substrate. For example, the first substrate may be a glass substrate. Further, the first substrate may be an array substrate or a counter substrate, and a first alignment layer is a conventional alignment layer, and may be made by way of rubbing. For example, a layer of a conventional aligning fluid is coated firstly on a first substrate (for example, a Polyimide (briefly called as PI) fluid is used as the aligning fluid), a solidification treatment is conducted on the first substrate with the aligning fluid coated thereon, so that the aligning fluid is formed into a solidified film, and then a rubbing treatment is conducted on the solidified film, so as to form a first alignment layer having an alignment direction along a first direction.

A second alignment layer, which is a cholesteric liquid crystal polymer alignment layer containing a chiral azobenzene compound, is formed on the first alignment layer. In correspondence with each column pixel area, the second alignment layer has a first aligning unit and a second aligning unit that are arranged separately and penetrate the column pixel areas, wherein, the first aligning unit and the second aligning unit have different alignment directions. For example, firstly, a chiral azobenzene compound with a mass fraction of 1.0%:

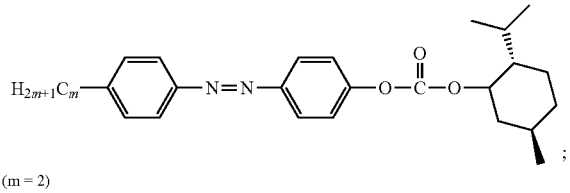

(m = 2)

a cholesteric liquid crystal polymerizable monomer with a mass fraction of 46.7%:

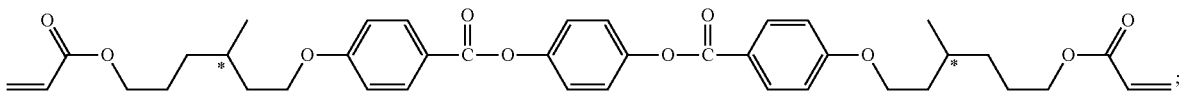

a thermally polymerizable monomer DGEBF with a mass fraction of 10.0%;

a thermally polymerizable monomer PACM with a mass fraction of 40.0%; and a photoinitiator

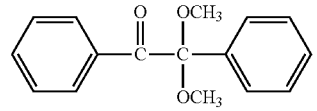 [SMILES: COC(OC)(C(=O)c1ccccc1)c1ccccc1]

with a mass fraction of 2.3% are mixed evenly to obtain a mixture. The screw-pitch of this mixture increases gradually as the UV irradiation time increases. When the UV irradiation is 60 s, size of screw-pitch of the mixture is 1350 nm, and when the UV irradiation is 120 s, size of screw-pitch of the mixture is 1687.5 nm. A layer of mixture with a thickness of 337.5 nm is evenly coated on the first alignment layer, which is operated avoiding light irradiation, so that a mixture layer is formed.

UV irradiation is conducted on the mixture layer via a first mask, so as to form first aligning units, and the first mask has an opening in correspondence with each of the first aligning units. For example, with a first mask and ultraviolet light with a light intensity of 5 mw/cm$^2$, the mixture layer is subjected to UV irradiation for 60 s. As the helically twisting power of a chiral azobenzene compound of the irradiated portion (i.e. first aligning units formed subsequently) will decrease, a helical structure with a pitch of 1350 nm is formed in the mixture layer accordingly. Meanwhile cholesteric liquid crystal polymerizable monomers of the irradiated portion undergo a cross-linking reaction to generate a cholesteric liquid crystal polymer, and this pitch is stabilized.

UV irradiation is conducted on the mixture layer via a second mask, so as to form second aligning units, and the second mask has an opening in correspondence with each of the second aligning units. For example, with a second mask and ultraviolet light with a light intensity of 5 mw/cm$^2$, the mixture layer is subjected to UV irradiation for 120 s, and then another different size of pitch (being 1687.5 nm) is formed in the mixture layer irradiated through an opening of the second mask. That is, different molecule arrangements are formed in mixture layer at adjacent regions. Meanwhile cholesteric liquid crystal polymerizable monomers undergo a cross-linking reaction to generate a liquid crystal polymer, and this pitch is stabilized.

After that, the mixture layer is heated at 55° C. for 40 min, so that thermally polymerizable monomers DGEBF react with thermally polymerizable monomers PACM in the mixture to form a polymer, so as to further stabilize the above two pitches.

With the use of a dissolution method with solvent, for example, cholesteric liquid crystal polymerizable monomers and thermally polymerizable monomers DGEBF as well as thermally polymerizable monomers PACM that are not irradiated by ultraviolet light (namely, not reacted) are removed with dichloromethane, so that a cholesteric liquid crystal polymer alignment layer containing a chiral azobenzene compound is formed on the first alignment layer. The cholesteric liquid crystal polymer alignment layer containing a chiral azobenzene compound has first aligning units and second aligning units, respectively, and alignment directions of the first aligning units and the second aligning units are different, and make an angle of 18 degrees. Alignment directions of the first aligning units and the second aligning units in the second alignment layer are each different from the alignment direction of the first alignment layer.

A TFT substrate and a CF substrate, on which liquid crystals and a sealant are dripped, are cell-assembled under vacuum, so as to produce a liquid crystal panel. In the liquid crystal panel, liquid crystal molecules in direct contact with the first aligning units within one pixel are initially arranged in the alignment direction of the first aligning units. While liquid crystal molecules in contact with the second aligning units are initially arranged in the alignment direction of the second aligning units (aligning direction of surface molecules). Consequently, multiple initial alignments of liquid crystal molecules are formed within one pixel, and a liquid crystal multi-domain display is realized.

As compared to a common liquid crystal panel with multi-domain display, control of domain number of the multi-domain display is achieved more easily by the liquid crystal obtained by using the technical solution according to embodiments of the present disclosure, and control of domain number can be achieved simply and conveniently by means of designing the opening location and the opening size of a mask. Furthermore, alignment direction of a second alignment layer constituted by a cholesteric liquid crystal polymer that contains a chiral azobenzene compound may be adjusted within the range of 0 degree to 360 degrees, and thus the design for making the alignment direction of the second alignment layer different from the alignment direction of the first alignment layer is controlled favorably.

It is to be noted that, (1) unless otherwise defined, the technical terminology or scientific terminology used herein should have the same meaning as commonly understood by one of ordinary skill in the art to which this disclosure belongs. "First", "second" and the like used in the present disclosure do not show any order, number or importance, but are only used to distinguish different constituent parts. (2) a counter substrate and an array substrate in embodiments of the present disclosure are disposed oppositely, and are upper and lower substrates of a display panel, respectively; generally, an array of thin film transistors and other display structure are formed on the array substrate, and a color resin is formed on the counter substrate. For example, the counter substrate is a color filter substrate. (3) a "column pixel area" in embodiments of the present disclosure may also be replaced by a "row pixel area". No discrimination is made between row and column in embodiments of the present disclosure, and they can be replaced equivalently. (4) in a liquid crystal panel provided by embodiments of the present disclosure, it is possible that only an array substrate or a counter substrate has an alignment layer structure as stated in embodiments of the present disclosure, and it is also possible that an array substrate and a counter substrate each have an alignment layer structure as stated in embodiments of the present disclosure. (5) various raw materials involved in embodiments of the present disclosure are each existing substances, and they may be made by oneself with reference to usual technology, and may also be obtained by means of purchase. Several obtaining ways will be given below as examples. However, various raw materials in embodiments of the present disclosure are not limited to the obtaining ways given below, and may also be obtained by other way. For example, a chiral azobenzene compound can be made by oneself. For example, the fabricating method of an m=6 chiral azobenzene compound is that, 1 mole of 4-hexyl-4'-hydroxy azobenzene and 2 mole of triethylamine are dissolved in anhydrous tetrahydrofuran, and it is stirred in an ice bath, so as to form a solution 1; 1 mole of menthyl chloroform is dissolved in anhydrous tetrahydrofuran, it is dropped slowly into the solution 1 under the condition of an ice bath, they react for 20 hours at the room temperature, and after end of reaction, column chromatography and recrystallization purification are performed, thereby obtaining a chiral azo compound of 4-hexyl-4'-hydroxy. For example, regarding the fabricating method of a cholesteric liquid crystal polymerizable monomer, reference to a document (Adv. Mater. 1999, 11, No. 7, 573-578) can be made, the photoinitiator may be purchased from Ciba Specialty Chemicals, bisphenol F epoxy resin can be purchased from Zhao Change International Trade Co., Ltd. in Shanghai, and 4,4'-diamino dicyclohexyl methane may be purchased from Hao Shen Trade Co., Ltd. in Shanghai.

Descriptions made above are merely specific embodiments of the present disclosure, but the protection scope of the disclosure is not limited thereto. Changes or replacements, as easily conceivable by those skilled in the art within the technical scope disclosed by the disclosure, shall be encompassed within the protection scope of the disclosure. Therefore, the protection scope of the disclosure shall be determined by the protection scope of attached claims.

The present application claims the priority of the Chinese patent application No. 201510041390.1 filed on Jan. 27, 2015, the entirety of which is incorporated herein by reference as a part of the present application.

The invention claimed is:

1. A manufacturing method of a liquid crystal panel, comprising:
forming a first alignment layer covering a surface of a first substrate and having an alignment direction along a first direction on the first substrate, wherein the first substrate includes multiple column pixel areas; and
forming, on the first alignment layer, a second alignment layer having an alignment direction along a second direction, wherein the first direction and the second direction are different, and, in correspondence with each of the column pixel areas, the second alignment layer has at least one aligning unit that penetrates a corresponding column pixel area, and a width of the at least one aligning unit is smaller than a width of the corresponding column pixel area,
wherein the second alignment layer is a cholesteric liquid crystal polymer alignment layer containing a chiral azobenzene compound.

2. The manufacturing method according to claim 1, wherein, in the case that in correspondence with each of the column pixel areas, the second alignment layer has a plurality of aligning units penetrating each of the column pixel areas, alignment directions of the plurality of aligning units are the same or different.

3. The manufacturing method according to claim 2, wherein, regarding the plurality of the aligning units in correspondence with each of the column pixel areas, in the case that alignment directions of the plurality of aligning units are the same, the plurality of the aligning units are arranged separately; and in the case that alignment directions of the plurality of aligning units are different, the plurality of aligning units with different alignment directions are arranged alternately.

4. The manufacturing method according to claim 3, wherein, forming the second alignment layer having an alignment direction along the second direction comprises:
coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;
conducting ultraviolet irradiation on the mixture layer via a mask, so that a portion of the mixture layer irradiated by ultraviolet light is formed to have an alignment along the second direction, the mask having an opening corresponding to each of the aligning units; and
removing a portion of the mixture layer not irradiated by ultraviolet light, thus forming the second alignment layer.

5. The manufacturing method according to claim 2, wherein, in correspondence with each of the column pixel areas, the second alignment layer has two aligning units penetrating each of the column pixel areas, and forming the second alignment layer having an alignment direction along the second direction on the first alignment layer comprises:
coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;
conducting ultraviolet irradiation on the mixture layer via a first mask, so as to form first aligning units, the first mask having an opening corresponding to each of the first aligning units;
conducting ultraviolet irradiation on the mixture layer via a second mask, so as to form second aligning units, the second mask having an opening corresponding to each of the second aligning units; and
removing a portion of the mixture layer not irradiated by ultraviolet light, thus forming the second alignment layer.

6. The manufacturing method according to claim 5, wherein, the mixture layer further includes a thermally polymerizable monomer, the thermally polymerizable monomer includes a bisphenol F epoxy resin and 4,4'-diamino dicyclohexyl methane, the content of which are 10 to 40 parts by weight and 10 to 40 parts by weight, respectively, after the mixture layer is subjected to ultraviolet irradiation via a mask, the method further includes heating the first substrate subjected to ultraviolet irradiation to a set temperature, thus stabilizing the second alignment direction.

7. The manufacturing method according to claim 5, wherein, the chiral azobenzene compound is:

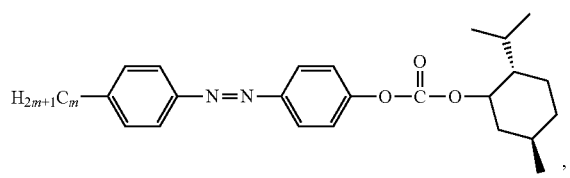

wherein, m is an integer chosen from 1 to 10;
the cholesteric liquid crystal polymerizable monomer is:

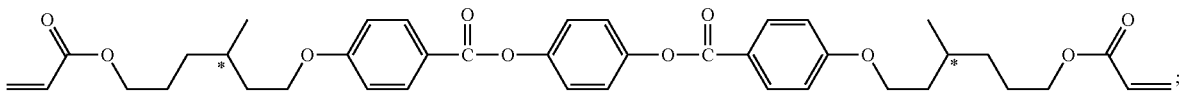

the photoinitiator is:

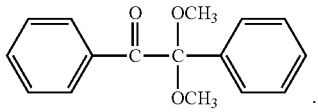

8. The manufacturing method according to claim 2, wherein, forming the second alignment layer having an alignment direction along the second direction comprises:
coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;
conducting ultraviolet irradiation on the mixture layer via a mask, so that a portion of the mixture layer irradiated by ultraviolet light is formed to have an alignment along the second direction, the mask having an opening corresponding to each of the aligning units; and
removing a portion of the mixture layer not irradiated by ultraviolet light, thus forming the second alignment layer.

9. The manufacturing method according to claim 1, wherein, forming the second alignment layer having an alignment direction along the second direction comprises:
coating a mixture layer that includes a chiral azobenzene compound, a cholesteric liquid crystal polymerizable monomer and a photoinitiator over the first alignment layer, wherein, content of the chiral azobenzene compound is 1 to 15 parts by weight, content of the cholesteric liquid crystal polymerizable monomer is 35 to 49 parts by weight, and content of the photoinitiator is 1.75 to 2.45 parts by weight;
conducting ultraviolet irradiation on the mixture layer via a mask, so that a portion of the mixture layer irradiated by ultraviolet light is formed to have an alignment along the second direction, the mask having an opening corresponding to the at least one aligning unit and
removing a portion of the mixture layer not irradiated by ultraviolet light, thus forming the second alignment layer.

10. The manufacturing method according to claim 9, wherein, the mixture layer further includes a thermally polymerizable monomer, the thermally polymerizable monomer includes a bisphenol F epoxy resin and 4,4'-diamino dicyclohexyl methane, the content of which are 10 to 40 parts by weight and 10 to 40 parts by weight, respectively, after the mixture layer is subjected to ultraviolet irradiation via a mask, the method further includes heating the first substrate subjected to ultraviolet irradiation to a set temperature, thus stabilizing the second alignment direction.

11. The manufacturing method according to claim 10, wherein, the bisphenol F epoxy resin is:

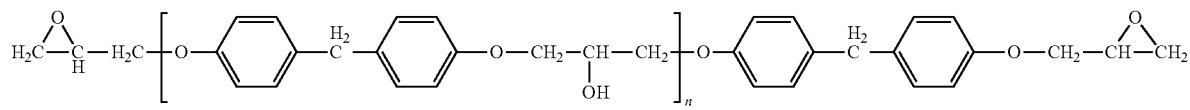

wherein, n is an integer chosen from 1 to 6.

12. The manufacturing method according to claim 9, wherein, the chiral azobenzene compound is:

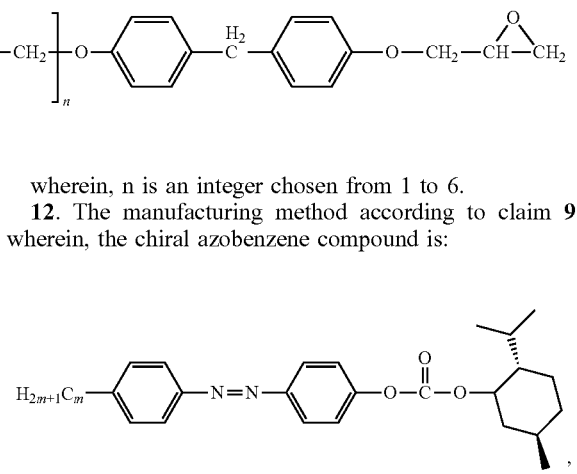

wherein, m is an integer chosen from 1 to 10;
the cholesteric liquid crystal polymerizable monomer is:

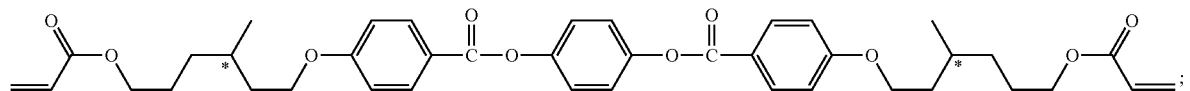 [SMILES: C=CC(=O)OCCCC(C)CCOc1ccc(C(=O)Oc2ccc(OC(=O)c3ccc(OCCC(C)CCCOC(=O)C=C)cc3)cc2)cc1]

the photoinitiator is:

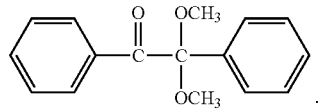 [SMILES: COC(OC)(C(=O)c1ccccc1)c1ccccc1]

13. The manufacturing method according to claim 1, further comprising: cell-assembling a second substrate and the first substrate under vacuum.

14. A liquid crystal panel, comprising a first substrate and a second substrate that are cell-assembled, and a liquid crystal layer disposed between the first substrate and the second substrate, wherein, the first substrate and/or the second substrate have/has an alignment layer facing the liquid crystal layer, wherein the alignment layer comprises:
a first alignment layer covering a surface of a substrate and having an alignment direction along a first direction, wherein the substrate comprises multiple column pixel areas; and
a second alignment layer located on the first alignment layer facing the liquid crystal layer and having an alignment direction along a second direction, wherein the first direction and the second direction are different directions, and, in correspondence with each of the column pixel areas, the second alignment layer has at least one aligning unit that penetrates a corresponding column pixel area, and a width of the at least one aligning unit is smaller than a width of the corresponding column pixel area, wherein the second alignment layer is a cholesteric liquid crystal polymer alignment layer containing a chiral azobenzene compound.

15. The liquid crystal panel according to claim 14, wherein, in the case that in correspondence with each column pixel area, the second alignment layer has a plurality of aligning units penetrating each of the column pixel areas, alignment directions of the plurality of aligning units are the same or different.

16. The liquid crystal panel according to claim 15, wherein, regarding the plurality of the aligning units in correspondence with each of the column pixel areas, in the case that alignment directions of the plurality of aligning units are the same, the plurality of the aligning units are arranged separately; and in the case that alignment directions of the plurality of aligning units are different, the plurality of aligning units with different alignment directions are arranged alternately.

17. A display apparatus, comprising the liquid crystal panel according to claim 14.

* * * * *